US011903010B2

(12) United States Patent
Li et al.

(10) Patent No.: US 11,903,010 B2
(45) Date of Patent: Feb. 13, 2024

(54) SIDELINK QUALITY MEASUREMENT METHOD AND COMMUNICATIONS APPARATUS

(71) Applicant: Huawei Technologies Co., Ltd., Shenzhen (CN)

(72) Inventors: Tianze Li, Shanghai (CN); Zhengzheng Xiang, Shanghai (CN); Jinfang Zhang, Shenzhen (CN); Hongjia Su, Shanghai (CN); Lei Lu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 427 days.

(21) Appl. No.: 17/339,561

(22) Filed: Jun. 4, 2021

(65) Prior Publication Data

US 2021/0298030 A1 Sep. 23, 2021

Related U.S. Application Data

(63) Continuation of application No. PCT/CN2019/123101, filed on Dec. 4, 2019.

(30) Foreign Application Priority Data

Dec. 5, 2018 (CN) .......................... 201811481307.2

(51) Int. Cl.
*H04W 72/542* (2023.01)
*H04W 76/11* (2018.01)
(Continued)

(52) U.S. Cl.
CPC ..... *H04W 72/542* (2023.01); *H04W 72/0446* (2013.01); *H04W 72/0453* (2013.01); *H04W 72/23* (2023.01); *H04W 76/11* (2018.02)

(58) Field of Classification Search
CPC ... H04W 72/542; H04W 76/11; H04W 72/23; H04W 72/0446; H04W 72/0453
See application file for complete search history.

(56) References Cited

U.S. PATENT DOCUMENTS

2017/0347338 A1 11/2017 Chen et al.
2018/0206176 A1 7/2018 Panteleev et al.
(Continued)

FOREIGN PATENT DOCUMENTS

CN 107534982 A 1/2018
CN 107888248 A 4/2018
(Continued)

OTHER PUBLICATIONS

Huawei et al., "Discussion on Reference Signal for Sidelink Control and Data Channel Design", 3GPP TSG RAN WG1 Meeting #94bis, R1-1810710, Chengdu, China, Oct. 8-12, 2018, 5 pages.
(Continued)

*Primary Examiner* — Duc C Ho
(74) *Attorney, Agent, or Firm* — Slater Matsil, LLP

(57) ABSTRACT

This application provides a sidelink quality measurement method and a communications apparatus. The method includes: A first terminal device sends a reference signal to a second terminal device, where the reference signal is used to determine channel state information of a first sidelink, and the first sidelink is a direct link from the first terminal device to the second terminal device. The first terminal device receives, from the second terminal device, the channel state information of the first sidelink.

20 Claims, 12 Drawing Sheets

(51) Int. Cl.
    *H04W 72/0446* (2023.01)
    *H04W 72/0453* (2023.01)
    *H04W 72/23* (2023.01)

(56) References Cited

U.S. PATENT DOCUMENTS

| | | | |
|---|---|---|---|
| 2018/0234146 A1 | 8/2018 | Onggosanusi et al. | |
| 2020/0146000 A1* | 5/2020 | Shin | H04W 4/40 |

FOREIGN PATENT DOCUMENTS

| | | |
|---|---|---|
| CN | 107889080 A | 4/2018 |
| CN | 108633066 A | 10/2018 |
| EP | 3177055 A1 | 6/2017 |
| WO | 2017035754 A1 | 3/2017 |
| WO | 2017171437 A1 | 10/2017 |
| WO | 2018203738 A1 | 11/2018 |

OTHER PUBLICATIONS

Huawei et al., "Sidelink physical layer procedures for NR V2X", 3GPP TSG RAN WG1 Meeting #95, R1-1812205, Spokane, WA, USA, Nov. 12-16, 2018, 12 pages.

3GPP US 38.211 V15.3.0 (Sep. 2018), 3rd Generation Partnership Project; Technical Specification Group Radio Access Network; NR; Physical channels and modulation(Release 15), 96 pages.

Ericsson, "On SCI formats", 3GPP TSG-RAN WG1 Meeting #94bis, R1-1813649, Chengdu, China, Oct. 8-12, 2018, 2 pages.

Huawei et al., "Sidelink physical layer structure for NR V2X", 3GPP TSG RAN WG1 Meeting #95, Spokane, WA, USA, Nov. 12-16, 2018, 12 pages.

Chen S, et al. "Technologies, standards and applications of LTE-V2X for vehicular networks", Telecommunications Science, vol. 34, Issue 4, Apr. 20, 2018, 11 pages.

* cited by examiner

SIDELINK QUALITY MEASUREMENT METHOD AND COMMUNICATIONS APPARATUS

CROSS-REFERENCE TO RELATED APPLICATIONS

This application is a continuation of International Application No. PCT/CN2019/123101, filed on Dec. 4, 2019, which claims priority to Chinese Patent Application No. 201811481307.2, filed on Dec. 5, 2018. The disclosures of the aforementioned applications are hereby incorporated by reference in their entireties.

TECHNICAL FIELD

This application relates to the communications field, and more specifically, to a sidelink quality measurement method and a communications apparatus.

BACKGROUND

Vehicle to everything (V2X) communication is a key technology for implementing environmental perception and information exchange in the internet of vehicles. The "everything" herein may be another vehicle, an infrastructure, a pedestrian, a terminal device, or the like. Two types of interfaces are defined in V2X. One type of interface is defined as a Uu interface with a communications protocol between a terminal device and a network device. The other type of interface is defined as an interface for sidelink (SL) transmission, and a sidelink is a communications link between terminal devices. The interface for SL transmission is defined with a communications protocol used between the terminal devices.

Currently, resources used for SL data transmission are allocated in advance, and are of a fixed size. Consequently, efficiency and reliability of data transmission on an SL link are relatively low, and user experience is severely affected.

SUMMARY

This application specifically provides a sidelink quality measurement method, to implement CSI measurement in SL communication, so as to determine, based on CSI, a time-frequency resource used in SL data transmission, thereby improving efficiency and reliability of SL data transmission, and improving user experience.

According to a first aspect, a sidelink quality measurement method is provided. The method may be performed by a first terminal device or a chip used in the first terminal device. The method includes: The first terminal device sends a reference signal to a second terminal device, where the reference signal is used to determine channel state information of a first sidelink, and the first sidelink is a direct link from the first terminal device to the second terminal device. The first terminal device receives, from the second terminal device, the channel state information of the first sidelink.

According to the sidelink quality measurement method provided in the first aspect, CSI measurement can be implemented in SL communication. The first terminal device may obtain the channel state information of the link from the first terminal device to the second terminal device. The channel state information is used, so that efficiency and reliability of data transmission between the first terminal device and the second terminal device can be improved, and user experience can be improved.

In a possible implementation of the first aspect, the method further includes: The first terminal device obtains a transmission parameter of first data and a time-frequency resource that is to be used to send the first data, where the time-frequency resource to be used to send the first data and the transmission parameter of the first data are determined based on the channel state information of the first sidelink and the first data. The first terminal device sends the first data to the second terminal device on the time-frequency resource based on the transmission parameter. In this implementation, the first terminal device may determine, based on the channel state information of the link from the first terminal device to the second terminal device, the time-frequency resource to be used to send the data to the second terminal device and the transmission parameter, and send the data or control information to the second terminal device based on the transmission parameter and the time-frequency resource. This improves efficiency and reliability of data transmission between the first terminal device and the second terminal device, and improves user experience.

In a possible implementation of the first aspect, the method further includes: The first terminal device sends, to a network device, the channel state information of the first sidelink. The first terminal device sends a first request message to the network device, where the first request message is used by the first terminal device to request, from the network device, a time-frequency resource to be used to transmit the first data. That the first terminal device obtains a transmission parameter of first data and a time-frequency resource that is to be used to send the first data includes: The first terminal device receives downlink control information from the network device, where the downlink control information includes the transmission parameter of the first data and a position of the time-frequency resource that is to be used to send the first data. In this implementation, the network device determines the transmission parameter of the first data and the time-frequency resource that is to be used to send the first data, and notifies the first terminal device of the determined time-frequency resource to be used to send the first data and the determined transmission parameter of the first data, so that the time-frequency resource to be used to send the first data and the transmission parameter of the first data are relatively accurate. This greatly avoids a conflict between a data transmission resource on another sidelink and the time-frequency resource for sending the first data and the transmission parameter of the first data, to further improve efficiency and accuracy of sending data by the first terminal device to the second terminal device.

In a possible implementation of the first aspect, that the first terminal device obtains a transmission parameter of first data and a time-frequency resource that is to be used to send the first data includes: The first terminal device determines, based on the channel state information of the first sidelink and the first data, the transmission parameter of the first data and the time-frequency resource that is to be used to send the first data. In this implementation, the first terminal device determines the transmission parameter of the first data and the time-frequency resource to be used to send the first data. Because the first terminal device does not need to report, to the network device, the channel state information of the first sidelink, signaling overheads can be reduced, and resource utilization can be improved.

In a possible implementation of the first aspect, that the first terminal device obtains a transmission parameter of first data and a time-frequency resource to be used to send the first data includes: The first terminal device determines, based on the channel state information of the first sidelink and the first data, the transmission parameter of the first data and the time-frequency resource that is to be used to send the first data. The first terminal device sends first indication information to a network device, where the first indication information is used to indicate a start position and a size of the time-frequency resource to be used to send the first data. The first terminal device receives downlink control information from the network device, where the downlink control information includes grant information of the time-frequency resource, and the grant information is used to indicate the first terminal device to send the first data on the time-frequency resource to be used to send the first data. In this implementation, the first terminal device determines the time-frequency resource to be used to send the first data, and applies to the network device for a grant. Because the first terminal device does not need to report, to the network device, the channel state information of the first sidelink, signaling overheads can be reduced, and resource utilization can be improved. In addition, granted by the network device, the time-frequency resource to be used to send the first data and the transmission parameter of the first data are relatively accurate. This greatly avoids a conflict between the time-frequency resource for sending the first data and a data transmission resource on another sidelink, to further improve efficiency and accuracy of sending data by the first terminal device to the second terminal device.

In a possible implementation of the first aspect, that the first terminal device sends, to the network device, the channel state information of the first sidelink includes: The first terminal device sends, to the network device, the channel state information of the first sidelink on a first time-frequency resource. A resource used by the first terminal device to send, to the network device, channel state information of a downlink is a second time-frequency resource, the downlink is a link from the network device to the first terminal device, and the first time-frequency resource and the second time-frequency resource are different in time domain and/or frequency domain. In this implementation, different time-frequency resources are configured for sending the channel state information of the first sidelink and sending the channel state information of the downlink, to distinguish between the channel state information of the first sidelink and the channel state information of the downlink. A determining result is relatively accurate and this is easy to implement. In addition, other information does not need to be introduced into the channel state information of the first sidelink and the channel state information of the downlink, to reduce resource consumption and improve resource utilization.

In a possible implementation of the first aspect, the channel state information of the first sidelink includes an identifier of the second terminal device, and the channel state information of the downlink from the network device to the first terminal device does not carry the identifier of the second terminal device. In this implementation, the channel state information of the first sidelink and the channel state information of the downlink carry identifiers of different terminal devices, to distinguish between the channel state information of the first sidelink and the channel state information of the downlink, so that a determining result is relatively accurate. This improves efficiency of distinguishing between channel state information of different links by the network device, and further improves efficiency of determining, by the network device, the transmission parameter of the first data and the time-frequency resource that is to be used to send the first data.

In a possible implementation of the first aspect, the method further includes: The first terminal device receives, from the second terminal device, channel state information of a second sidelink, where the second sidelink is a direct link from the second terminal device to a third terminal device. The first terminal device obtains channel state information of a third sidelink, where the third sidelink is a direct link from the first terminal device to the third terminal device. In this implementation, the first terminal device can flexibly select, from a plurality of links by using channel state information of the plurality of sidelinks, a link that is finally used to transmit data, to improve data transmission reliability and efficiency.

In a possible implementation of the first aspect, the channel state information of the second sidelink includes the identifier of the second terminal device and an identifier of the third terminal device, a time domain position of a field that carries the identifier of the second terminal device is before a time domain position of a field that carries the identifier of the third terminal device, and the identifier of the second terminal device and the identifier of the third terminal device are used to indicate the second sidelink. In this implementation, a sequence in a link or a direction of a link is determined by using a sequence of the identifiers of the terminal devices that are carried in the channel state information of the sidelink. A determining result is relatively accurate, and this is easy to implement and saves resources.

According to a second aspect, a sidelink quality measurement method is provided. The method may be performed by a second terminal device or a chip used in the second terminal device. The method includes: The second terminal device receives a reference signal from a first terminal device. The second terminal device determines channel state information of a first sidelink based on the reference signal, where the first sidelink is a direct link from the first terminal device to the second terminal device. The second terminal device sends, to the first terminal device and/or a network device, the channel state information of the first sidelink. The second terminal device receives, based on a transmission parameter of first data on a time-frequency resource for sending the first data, the first data sent by the first terminal device, where the time-frequency resource for sending the first data and the transmission parameter of the first data are determined based on the channel state information of the first sidelink.

According to the sidelink quality measurement method provided in the second aspect, CSI measurement can be implemented in SL communication. In addition, the second terminal device may receive, based on the time-frequency resource for sending the first data by the first terminal device and the transmission parameter, the first data or control information sent by the first terminal device, to improve efficiency and reliability of receiving the first data by the second terminal device, and improve user experience.

In a possible implementation of the second aspect, that the second terminal device sends, to a network device, the channel state information of the first sidelink includes: The second terminal device sends, to the network device, the channel state information of the first sidelink on a third time-frequency resource. A resource used by the second terminal device to send, to the network device, channel state information of a downlink is a fourth time-frequency resource, the downlink is a link from the network device to the second terminal device, and the third time-frequency resource and the fourth time-frequency resource are different in time domain and/or frequency domain. In this implementation, different time-frequency resources are configured for sending the channel state information of the first sidelink and sending the channel state information of the downlink, to distinguish between the channel state information of the first sidelink and the channel state information of the downlink. A determining result is relatively accurate and this is easy to implement. In addition, other information does not need to be introduced into the channel state information of the first sidelink and the channel state information of the downlink, to reduce resource consumption and improve resource utilization.

In a possible implementation of the second aspect, the channel state information of the first sidelink includes an identifier of the first terminal device. The channel state information of the downlink from the network device to the second terminal device does not carry the identifier of the first terminal device. In this implementation, the channel state information of the first sidelink and the channel state information of the downlink carry identifiers of different terminal devices, to distinguish between the channel state information of the first sidelink and the channel state information of the downlink, so that a determining result is relatively accurate. This improves efficiency of distinguishing between channel state information of different links by the network device.

In a possible implementation of the second aspect, the method further includes: The second terminal device obtains channel state information of a second sidelink, where the second sidelink is a direct link from the second terminal device to a third terminal device. The second terminal device sends, to the first terminal device, the channel state information of the second sidelink. In this implementation, the second terminal device may further obtain the channel state information of the second sidelink related to the second terminal device, and send, to the first terminal device, the channel state information of the second sidelink, so that a link that is finally used to transmit data can be flexibly selected from a plurality of links, to improve data transmission reliability and efficiency.

In a possible implementation of the second aspect, the method further includes: The second terminal device determines, based on the channel state information of the second sidelink, whether link quality of the second sidelink is greater than a first threshold. When the link quality of the second sidelink is greater than the first threshold, the second terminal device determines to send, to the first terminal device, the channel state information of the second sidelink. In this implementation, whether the channel state information of the second sidelink needs to be sent to the first terminal device is determined in the foregoing manner. This manner is flexible, and can improve resource utilization.

In a possible implementation of the second aspect, before the second terminal device sends, to the first terminal device, the channel state information of the second sidelink, the method further includes: The second terminal device determines that the link quality of the second sidelink is greater than the first threshold. Whether the channel state information of the second sidelink needs to be sent to the first terminal device is determined in the foregoing manner. This manner is flexible, and can improve resource utilization.

In a possible implementation of the second aspect, the channel state information of the second sidelink includes an identifier of the second terminal device and an identifier of the third terminal device, a time domain position of a field that carries the identifier of the second terminal device is before a time domain position of a field that carries the identifier of the third terminal device, and the identifier of the second terminal device and the identifier of the third terminal device are used to indicate the second sidelink.

According to a third aspect, a sidelink quality measurement method is provided. The method may be performed by a first terminal device or a chip used in the first terminal device. The method includes: A first terminal device sends a reference signal to a second terminal device, where the reference signal is used to determine channel state information of a first sidelink, and the first sidelink is a direct link from the first terminal device to the second terminal device. The first terminal device sends a first request message to a network device, where the first request message is used to request a time-frequency resource to be used to transmit first data, the first data is data to be sent by the first terminal device on the first sidelink, and the first sidelink is a direct link from the first terminal device to the second terminal device.

According to the sidelink quality measurement method provided in the third aspect, CSI measurement can be implemented in SL communication. The first terminal device does not need to obtain the channel state information of the first sidelink, but directly requests, from the network device, the time-frequency resource to be used to transmit the first data, to reduce signaling overheads. The time-frequency resource to be used to transmit the first data is determined based on the channel state information of the first sidelink. The channel state information is used, so that efficiency and reliability of data transmission between the first terminal device and the second terminal device can be improved, and user experience can be improved.

In a possible implementation of the third aspect, the method further includes: The first terminal device receives, from the network device, a transmission parameter of the first data and a time-frequency resource that is to be used to send the first data, where the time-frequency resource and the transmission parameter are determined based on the channel state information of the first sidelink and the first data. The first terminal device sends the first data to the second terminal device on the time-frequency resource based on the transmission parameter. In this implementation, because the time-frequency resource to be used to send the first data and the transmission parameter are determined by the network device based on the channel state information of the first sidelink, the first terminal device sends the first data or control information to the second terminal device based on the time-frequency resource and the transmission parameter. This improves efficiency and reliability of data transmission between the first terminal device and the second terminal device, and improves user experience.

In a possible implementation of the third aspect, the method further includes: The first terminal device receives, from the second terminal device, channel state information of a second sidelink, where the second sidelink is a direct link from the second terminal device to a third terminal device. The first terminal device obtains channel state information of a third sidelink, where the second sidelink is a direct link from the first terminal device to the third terminal device.

In a possible implementation of the third aspect, the channel state information of the second sidelink includes an identifier of the second terminal device and an identifier of the third terminal device, a time domain position of a field that carries the identifier of the second terminal device is before a time domain position of a field that carries the identifier of the third terminal device, and the identifier of the second terminal device and the identifier of the third terminal device are used to indicate the second sidelink.

According to a fourth aspect, a sidelink quality measurement method is provided. The method may be performed by a network device or a chip used in the network device. The method includes: The network device receives, from a first terminal device or a second terminal device, channel state information of a first sidelink, where the first sidelink is a direct link from the first terminal device to the second terminal device. The network device determines, based on the channel state information of the first sidelink and first data, a transmission parameter of the first data and a time-frequency resource that is to be used by the first terminal device to send the first data, where the first data is data to be sent by the first terminal device on the first sidelink. The network device sends downlink control information to the first terminal device, where the downlink control information includes the transmission parameter of the first data and the time-frequency resource that is to be used to send the first data.

According to the sidelink quality measurement method provided in the fourth aspect, the network device may obtain the channel state information of the first sidelink, determine, based on the channel state information of the first sidelink and the first data, the transmission parameter of the first data and the time-frequency resource that is to be used by the first terminal device to send the first data, and notify the first terminal device of the transmission parameter of the first data and the time-frequency resource that is to be used to send the first data, to improve efficiency and reliability of data transmission between the first terminal device and the second terminal device and improve user experience.

In a possible implementation of the fourth aspect, that the network device receives, from the first terminal device, the channel state information of the first sidelink includes: The network device receives, from the first terminal device, the channel state information of the first sidelink on a first time-frequency resource, where the first time-frequency resource and a second time-frequency resource are different in time domain and/or frequency domain, the second time-frequency resource is a resource used by the network device to receive, from the first terminal device, channel state information of a downlink, and the downlink is a link from the network device to the first terminal device. In this implementation, different time-frequency resources are configured for sending the channel state information of the first sidelink and sending the channel state information of the downlink, to distinguish between the channel state information of the first sidelink and the channel state information of the downlink. A determining result is relatively accurate and this is easy to implement, to reduce resource consumption and improve resource utilization.

In a possible implementation of the fourth aspect, the method further includes: The network device receives a first request message from the first terminal device, where the first request message is used by the first terminal device to request, from the network device, a time-frequency resource to be used to transmit the first data.

In a possible implementation of the fourth aspect, the channel state information of the first sidelink includes an identifier of the second terminal device. In this implementation, the channel state information of the first sidelink and the channel state information of the downlink carry identifiers of different terminal devices, to distinguish between the channel state information of the first sidelink and the channel state information of the downlink, so that a determining result is relatively accurate. This improves efficiency of distinguishing between channel state information of different links by the network device.

According to a fifth aspect, a sidelink quality measurement method is provided. The method may be performed by a network device or a chip used in the network device. The method includes: The network device receives first indication information from a first terminal device, where the first indication information indicates a start position and a size of a time-frequency resource to be used by the first terminal device to send first data, the first data is data to be sent by the first terminal device on a first sidelink, and the first sidelink is a direct link from the first terminal device to a second terminal device. The network device determines the time-frequency resource based on the first indication information. The network device sends downlink control information to the first terminal device, where the downlink control information includes grant information of the time-frequency resource, and the grant information is used to indicate the first terminal device to send the first data on the time-frequency resource.

According to the sidelink quality measurement method provided in the fifth aspect, the network device may not need to obtain the channel state information of the first sidelink, but receive the first indication information that is sent by the first terminal device and that is used to indicate the start position and the size of the time-frequency resource to be used by the first terminal device to send the first data. This can reduce signaling overheads and improve resource utilization. In addition, granted by the network device, the time-frequency resource to be used to send the first data and the transmission parameter of the first data are relatively accurate. This greatly avoids a conflict between the time-frequency resource for sending the first data and a data transmission resource on another sidelink, to further improve efficiency and accuracy of sending data by the first terminal device to the second terminal device.

In a possible implementation of the fifth aspect, the first indication information may be further used to indicate only a size of the time-frequency resource to be used to send the first data. The method further includes: After receiving the first indication information, the network device determines, based on the size of the time-frequency resource to be used to send the first data, a time-frequency position of the time-frequency resource to be used to send the first data.

According to a sixth aspect, a communications apparatus is provided. The apparatus includes: a transceiver unit, configured to send a reference signal to a second terminal device, where the reference signal is used to determine channel state information of a first sidelink, the first sidelink is a direct link from a first terminal device to the second terminal device, and the communications apparatus is the first terminal device, or the first terminal device includes the communications apparatus. The transceiver unit is further configured to receive, from the second terminal device, the channel state information of the first sidelink.

In a possible implementation of the sixth aspect, the communications apparatus further includes: a processing unit, configured to obtain a transmission parameter of first data and a time-frequency resource to be used to send the first data, where the time-frequency resource to be used to send the first data and the transmission parameter of the first data are determined based on the channel state information of the first sidelink and the first data. The transceiver unit is further configured to send the first data to the second terminal device on the time-frequency resource based on the transmission parameter.

In a possible implementation of the sixth aspect, the transceiver unit is further configured to send, to a network device, the channel state information of the first sidelink;

send a first request message to the network device, where the first request message is used by the first terminal device to request, from the network device, a time-frequency resource to be used to transmit the first data; and receive downlink control information from the network device, where the downlink control information includes the transmission parameter of the first data and a position of the time-frequency resource that is to be used to send the first data.

In a possible implementation of the sixth aspect, the transceiver unit is specifically configured to send, to the network device, the channel state information of the first sidelink on a first time-frequency resource, where the first time-frequency resource and a second time-frequency resource are different in time domain and/or frequency domain, the second time-frequency resource is a resource used by the first terminal device to send, to the network device, channel state information of a downlink, and the downlink is a link from the network device to the first terminal device.

In a possible implementation of the sixth aspect, the channel state information of the first sidelink includes an identifier of the second terminal device.

In a possible implementation of the sixth aspect, the processing unit is specifically configured to determine, based on the channel state information of the first sidelink and the first data, the time-frequency resource and the transmission parameter.

In a possible implementation of the sixth aspect, the transceiver unit is further configured to send first indication information to a network device, where the first indication information is used to indicate a start position and a size of the time-frequency resource to be used to send the first data; and receive downlink control information from the network device, where the downlink control information includes grant information of the time-frequency resource, and the grant information is used to indicate the first terminal device to send the first data on the time-frequency resource.

In a possible implementation of the sixth aspect, the transceiver unit is further configured to receive, from the second terminal device, channel state information of a second sidelink, where the second sidelink is a direct link from the second terminal device to a third terminal device.

In a possible implementation of the sixth aspect, the channel state information of the second sidelink includes the identifier of the second terminal device and an identifier of the third terminal device, a time domain position of a field that carries the identifier of the second terminal device is before a time domain position of a field that carries the identifier of the third terminal device, and the identifier of the second terminal device and the identifier of the third terminal device are used to indicate the second sidelink.

According to a seventh aspect, a communications apparatus is provided. The apparatus includes: a transceiver unit, configured to receive a reference signal from a first terminal device; and a processing unit, configured to determine channel state information of a first sidelink based on the reference signal, where the first sidelink is a direct link from the first terminal device to a second terminal device, and the communications apparatus is the second terminal device, or the second terminal device includes the communications apparatus. The transceiver unit is further configured to send, to the first terminal device and/or a network device, the channel state information of the first sidelink.

In a possible implementation of the seventh aspect, the transceiver unit is specifically configured to send, to the network device, the channel state information of the first sidelink on a third time-frequency resource, where the third time-frequency resource and a fourth time-frequency resource are different in time domain and/or frequency domain, and the fourth time-frequency resource is a resource used by the second terminal device to send, to the network device, channel state information of a downlink, and the downlink is a link from the network device to the second terminal device.

In a possible implementation of the seventh aspect, the channel state information of the first sidelink includes an identifier of the first terminal device.

In a possible implementation of the seventh aspect, the transceiver unit is further configured to send, to the first terminal device, channel state information of a second sidelink, where the second sidelink is a direct link from the second terminal device to a third terminal device.

In a possible implementation of the seventh aspect, before the transceiver unit sends, to the first terminal device, the channel state information of the second sidelink, the processing unit is further configured to determine that link quality of the second sidelink is greater than a first threshold.

In a possible implementation of the seventh aspect, the channel state information of the second sidelink includes an identifier of the second terminal device and an identifier of the third terminal device, a time domain position of a field that carries the identifier of the second terminal device is before a time domain position of a field that carries the identifier of the third terminal device, and the identifier of the second terminal device and the identifier of the third terminal device are used to indicate the second sidelink.

According to an eighth aspect, a communications apparatus is provided, including: a transceiver unit, configured to send a first request message to a network device, where the first request message is used to request a time-frequency resource to be used to transmit first data, the first data is data to be sent by a first terminal device on a first sidelink, the first sidelink is a direct link from the first terminal device to a second terminal device, and the communications apparatus is the first terminal device, or the first terminal device includes the communications apparatus. The transceiver unit is further configured to send a reference signal to the second terminal device, where the reference signal is used to determine the channel state information of the first sidelink.

In a possible implementation of the eighth aspect, the transceiver unit is further configured to receive, from the network device, a transmission parameter of the first data and the time-frequency resource that is to be used to send the first data, where the time-frequency resource and the transmission parameter are determined based on the channel state information of the first sidelink and the first data; and send the first data to the second terminal device on the time-frequency resource based on the transmission parameter.

In a possible implementation of the eighth aspect, the transceiver unit is further configured to receive, from the second terminal device, channel state information of a second sidelink, where the second sidelink is a direct link from the second terminal device to a third terminal device. The first terminal device obtains channel state information of a third sidelink, where the second sidelink is a direct link from the first terminal device to the third terminal device.

In a possible implementation of the eighth aspect, the channel state information of the second sidelink includes an identifier of the second terminal device and an identifier of the third terminal device, a time domain position of a field that carries the identifier of the second terminal device is before a time domain position of a field that carries the identifier of the third terminal device, and the identifier of the second terminal device and the identifier of the third terminal device are used to indicate the second sidelink.

According to a ninth aspect, a communications apparatus is provided, including: a transceiver unit, configured to receive, from a first terminal device or a second terminal device, channel state information of a first sidelink, where the first sidelink is a direct link from the first terminal device to the second terminal device; and a processing unit, configured to determine, based on the channel state information of the first sidelink and first data, a transmission parameter of the first data and a time-frequency resource that is to be used by the first terminal device to send the first data, where the first data is data to be sent by the first terminal device on the first sidelink. The transceiver unit is further configured to send downlink control information to the first terminal device, where the downlink control information includes the transmission parameter of the first data and the time-frequency resource to be used to send the first data.

In a possible implementation of the ninth aspect, the transceiver unit is specifically configured to receive, from the first terminal device, the channel state information of the first sidelink on a first time-frequency resource, where the first time-frequency resource and a second time-frequency resource are different in time domain and/or frequency domain, the second time-frequency resource is a resource used by a network device to receive, from the first terminal device, channel state information of a downlink, and the downlink is a link from the network device to the first terminal device. The communications apparatus is the network device, or the network device includes the communications apparatus.

In a possible implementation of the ninth aspect, the channel state information of the first sidelink includes an identifier of the second terminal device.

In a possible implementation of the ninth aspect, the transceiver unit is further configured to receive a first request message from the first terminal device, where the first request message is used by the first terminal device to request, from the network device, a time-frequency resource to be used to transmit the first data.

According to a tenth aspect, a communications apparatus is provided, including: a transceiver unit, configured to receive first indication information from a first terminal device, where the first indication information indicates a start position and a size of a time-frequency resource to be used by the first terminal device to send first data, the first data is data to be sent by the first terminal device on a first sidelink, and the first sidelink is a direct link from the first terminal device to a second terminal device; and a processing unit, configured to determine the time-frequency resource based on the first indication information. The transceiver unit is further configured to send downlink control information to the first terminal device, where the downlink control information includes grant information of the time-frequency resource, and the grant information is used to indicate the first terminal device to send the first data on the time-frequency resource.

In a possible implementation of the tenth aspect, the first indication information may be further used to indicate only a size of the time-frequency resource to be used to send the first data. The processing unit is specifically configured to determine, based on the size of the time-frequency resource to be used to send the first data, a time-frequency position of the time-frequency resource to be used to send the first data.

According to an eleventh aspect, a communications apparatus is provided. The apparatus includes at least one processor and a memory, and the at least one processor is configured to perform the method according to any one of the first aspect to the third aspect or the possible implementations of the first aspect to the third aspect.

According to a twelfth aspect, a communications apparatus is provided. The apparatus includes at least one processor and a memory, and the at least one processor is configured to perform the method according to any one of the fourth aspect and the fifth aspect or the possible implementations of the fourth aspect and the fifth aspect.

According to a thirteenth aspect, a terminal device is provided. The terminal device includes the communications apparatus according to any one of the sixth aspect to the eighth aspect or the possible implementations of the sixth aspect to eighth aspect, or the terminal device includes the communications apparatus according to the eleventh aspect.

According to a fourteenth aspect, a network device is provided. The network device includes the communications apparatus according to any one of the ninth aspect and the tenth aspect or the possible implementations of the ninth aspect and the tenth aspect, or the terminal device includes the communications apparatus according to the twelfth aspect.

According to a fifteenth aspect, a computer program product is provided. The computer program product includes a computer program. When the computer program is executed by a processor, the processor is enabled to perform the method according to any one of the first aspect to the fifth aspect or the possible implementations of the first aspect to the fifth aspect.

According to a sixteenth aspect, a computer-readable storage medium is provided. The computer-readable storage medium stores a computer program. The computer program is executed, to perform the method according to any one of the first aspect to the fifth aspect or the possible implementations of the first aspect to the fifth aspect.

According to a seventeenth aspect, a chip system is provided. The chip system includes a processor, configured to implement the functions in each of the foregoing aspects, for example, generate, receive, send, or process data and/or information in the foregoing methods. In a possible design, the chip system further includes a memory. The memory is configured to store necessary program instructions and necessary data. The chip system may include a chip, or may include a chip and another discrete component. The processor and the memory may be decoupled, separately disposed on different devices, and connected in a wired or wireless manner; or the processor and the memory may be coupled on a same device. Optionally, the communications apparatus provided in any one of the foregoing aspects includes the chip system.

DETAILED DESCRIPTION OF ILLUSTRATIVE EMBODIMENTS

Figure 1:
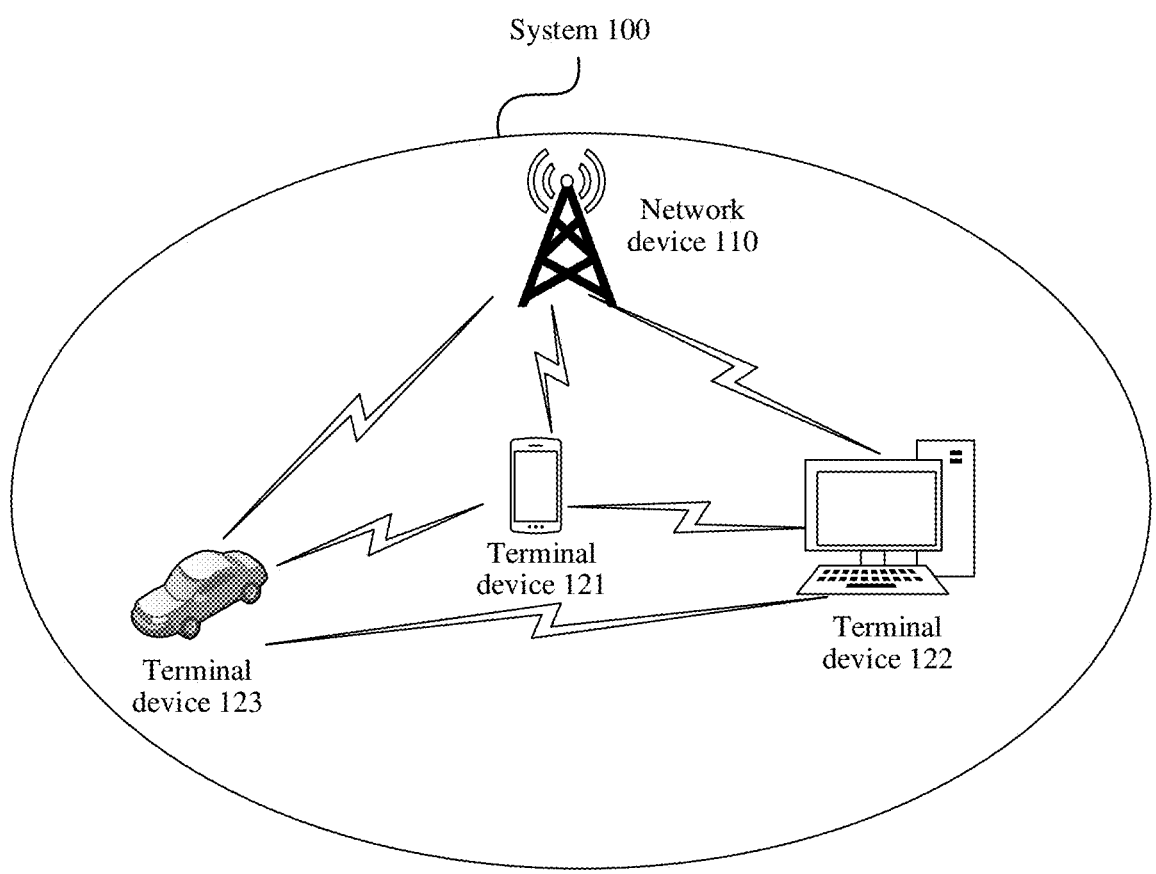
FIG. 1 is a schematic architectural diagram of a mobile communications system applicable to an embodiment of this application.

The following describes technical solutions of this application with reference to accompanying drawings.

The technical solutions in the embodiments of this application may be applied to various communications systems, for example, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future fifth generation (5G) system, or a new radio (NR) system.

A terminal device in the embodiments of this application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a cellular phone, a cordless phone, a session initiation protocol (SIP) phone, a wireless local loop (WLL) station, a personal digital assistant (PDA), a handheld device or a computing device having a wireless communication function, another processing device connected to a wireless modem, a vehicle-mounted device, a wearable device, a terminal device in a future 5G network, or a terminal device in a future evolved public land mobile network (public land mobile network, PLMN). This is not limited in the embodiments of this application.

A network device in the embodiments of this application may be a device configured to communicate with the terminal device. The network device may be a base transceiver station (BTS) in the global system for mobile communications (GSM) or the code division multiple access (CDMA) system, may be a NodeB (NB) in the wideband code division multiple access (WCDMA) system, may be an evolved NodeB (eNB or eNodeB) in the LTE system, or may be a radio controller in a cloud radio access network (CRAN) scenario. Alternatively, the network device may be a relay node, an access point, a vehicle-mounted device, a wearable device, a network device in the future 5G network, a network device in a future evolved PLMN network, or the like. This is not limited in the embodiments of this application.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more of computer operating systems implementing service processing through a process, for example, a Linux operating system, a Unix operating system, an Android operating system, an iOS operating system, and a Windows operating system. The application layer includes applications such as a browser, an address book, word processing software, and instant communications software. In addition, a specific structure of an execution body of a method provided in the embodiments of this application is not specifically limited in the embodiments of this application, provided that a program that records code for the method provided in the embodiments of this application can be run to perform communication according to the method provided in the embodiments of this application. For example, the method provided in the embodiments of this application may be performed by a terminal device, a network device, or a functional module that is in a terminal device or a network device and that can invoke and execute the program.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (compact disc, CD), or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The "machine-readable media" may include but is not limited to a radio channel, and various other media that can store, contain, and/or carry instructions and/or data.

In a wireless communications system, a channel condition is usually constantly changing. For example, the terminal device moves from an area with a good channel condition to an area with a poor channel condition, or when the terminal device moves on a street with high buildings on both sides, signals that are along the street in a signal propagation direction are enhanced, and signals that are perpendicular to the street in the signal propagation direction are weakened. It is assumed that when channel quality is very good, downlink data sent by the network device to the terminal device uses quadrature phase shift keying (QPSK) instead of a higher-order modulation scheme such as quadrature amplitude modulation (QAM). This causes reduced spectrum utilization, and a reduced throughput. If high-order QAM rather than QPSK modulation is used when channel quality is poor, excessive retransmissions occur. In either case, radio resources are not effectively used. To better adapt to a change of a radio channel, the terminal device may report downlink channel quality information to the network device by using channel state information (CSI), so that the network device selects a more reliable modulation and coding scheme (MCS), a less puncturing transmission manner, and better time-frequency resources for the terminal device.

The CSI is channel state information reported by the terminal device to the network device, and includes a channel quality indicator (CQI), a precoding matrix indicator (PMI), a precoding type indicator (PTI), and a channel matrix rank indicator (RI). A time-frequency resource occupied by the CSI is configured by the network device.

The terminal device obtains CSI information by measuring a received downlink (DL) reference signal (RS) (for example, a cell-specific reference signal, a channel state information reference signal (CSI-RS), and a demodulation reference signal (DMRS)), and reports the CSI information to the network device. The network device determines channel quality based on the CSI information. During downlink scheduling, the network device considers the channel quality, that is, determines, based on the CSI information, transmission resources, a transmission parameter, and the like for downlink data to be sent to the terminal device. CSI reported by a terminal device may be used to reflect channel quality information of time-frequency resources allocated to the terminal device, or may be used to reflect channel quality information of time-frequency resources that are not allocated to the terminal device. The cell-specific reference signal and the CSI-RS may be sent in an entire frequency band, and are used by the terminal device to perform CSI measurement.

V2X communication is a key technology for implementing environment awareness and information exchange in the internet of vehicles. The "everything" herein may be another vehicle, an infrastructure, a pedestrian, a terminal device, or the like. Two types of interfaces are defined in V2X. One type of interface is defined as a Uu interface with a communications protocol between a terminal device and a network device. The other type of interface is defined as an interface for sidelink (SL) transmission, and a sidelink is a communication direct link between terminal devices. A direct link may be understood as a link on which data is directly transmitted between two terminal devices, and there is no other network node between the two terminal devices. The interface for SL transmission defines a communications protocol used between the terminal devices. The Uu interface is defined with uplink and downlink transmission protocols similar to those of NR, basically inherits uplink and downlink transmission protocols of NR in terms of frequency band allocation, bandwidth, frame structures, transmission modes, and signaling definitions, and adds some V2X-dedicated signaling on this basis.

The interface for SL transmission (for example, a direct communications interface PC5 interface) has different designs in the foregoing aspects. For example, in terms of a frequency band, an uplink frequency band of NR may be reused, or an unlicensed frequency band may be used, and a dedicated frame structure and pilot design are used. Currently, however, the PC5 interface does not support a CSI measurement mechanism.

The interface for SL transmission currently does not support the CSI measurement mechanism. Consequently, in an SL communication scenario, the terminal device cannot determine CSI, and cannot determine, based on the CSI, a time-frequency resource to be used for SL data transmission. This severely reduces SL data transmission efficiency. Currently, however, in SL data transmission, resources used for SL data transmission are allocated in advance and are fixed. For example, an MCS remains unchanged, and a quantity of transmission resources, positions of the transmission resources, and the like are fixed. Because in SL data transmission, an amount of data transmitted each time is different, and channel quality may be different each time, transmitting data on fixed transmission resources greatly reduces SL data transmission efficiency and severely affects user experience.

Based on these problems, this application specifically provides a sidelink quality measurement method, to implement CSI measurement in SL communication, so as to determine, based on CSI, a time-frequency resource to be used in SL data transmission, thereby improving efficiency and reliability of SL data transmission, and improving user experience.

For ease of understanding the embodiments of this application, a communications system to which the embodiments of this application are applicable is first briefly described with reference to FIG. 1 and FIG. 2.

Figure 3:
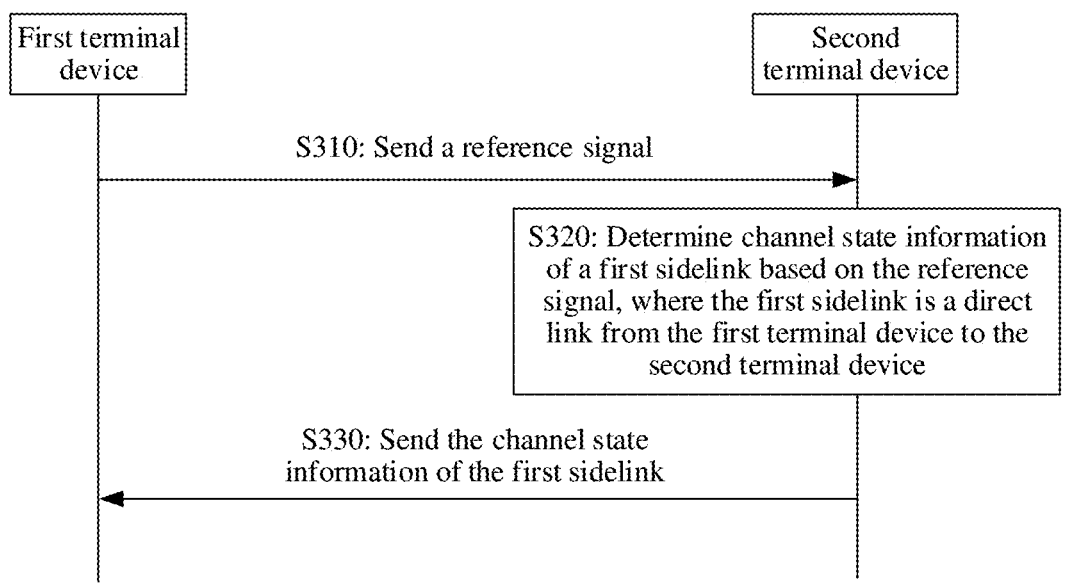
FIG. 3 is a schematic interaction diagram of an example of a sidelink quality measurement method according to an embodiment of this application.

FIG. 1 is a schematic diagram of a communications system 100 to which a communications method in the embodiments of this application is applicable. As shown in FIG. 3, the communications system 100 includes four communications devices, for example, a network device 110 and terminal devices 121 to 123. The network device 110 may perform data communication with at least one of the terminal devices 121 to 123 through wireless connection. For the terminal devices 121 to 123, a link established between every two of the terminal devices 121 to 123 is an SL. For example, when performing sidelink quality measurement and data transmission, the terminal devices 121 and 123 may measure channel quality and determine a transmission resource by using a sidelink quality measurement method in the embodiments of this application.

Figure 2:
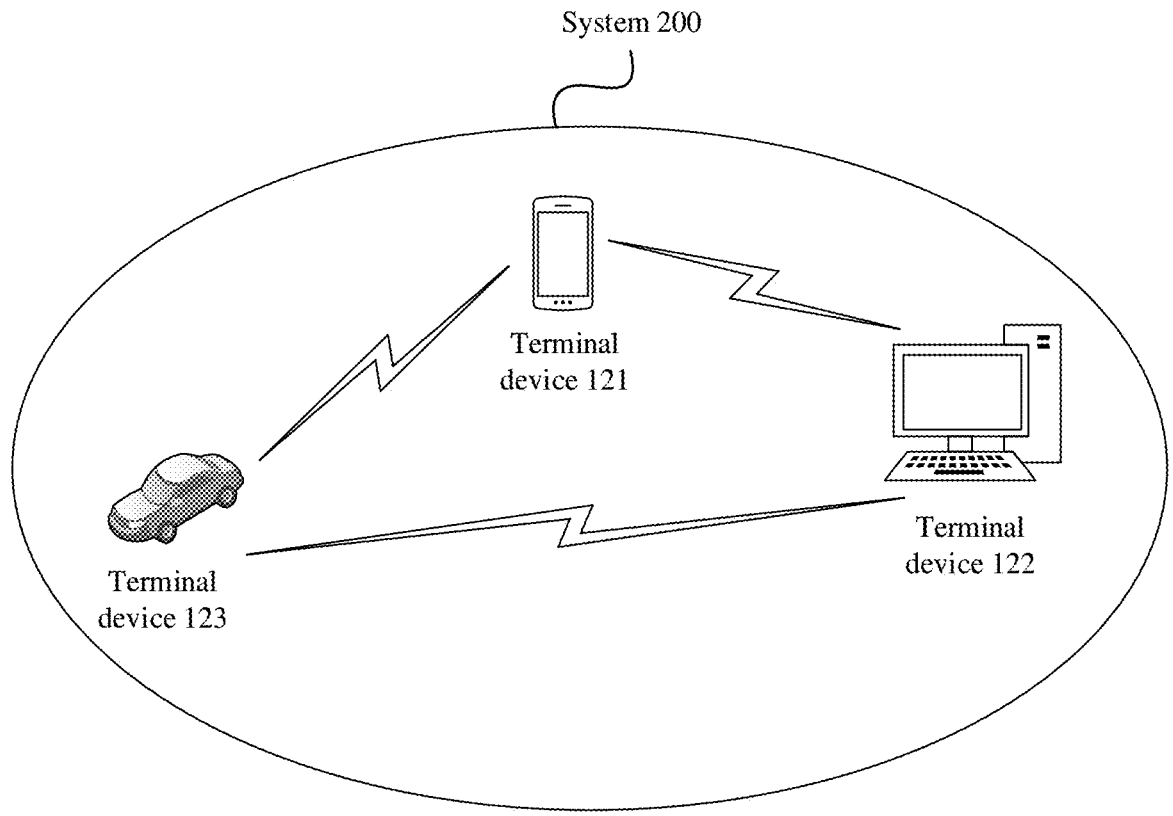
FIG. 2 is a schematic architectural diagram of another mobile communications system applicable to an embodiment of this application.

FIG. 2 is a schematic diagram of a communications system 200 applicable to the communications method in this embodiment of this application. As shown in FIG. 2, the communications system 200 includes three communications devices, for example, terminal devices 121 to 123. The terminal devices may perform data communication with each other in a device to device (D2D) or V2X communications manner. For the terminal devices 121 to 123, a link between every two of the terminal devices 121 to 123 is an SL. For example, when performing sidelink quality measurement and data transmission, the terminal devices 123 and 122 may measure channel quality and determine a transmission resource by using a sidelink quality measurement method in the embodiments of this application.

It should be understood that the communications systems shown in FIG. 1 and FIG. 2 each may further include more network nodes, for example, terminal devices or network devices. The network devices or terminal devices included in the communications systems shown in FIG. 1 and FIG. 2 may be the network devices or terminal devices in the foregoing various forms. The network devices or terminal devices are not shown one by one in the figures of the embodiments of this application.

The following describes in detail a sidelink quality measurement method provided in this application with reference to FIG. 3. FIG. 3 is a schematic interaction diagram of a sidelink quality measurement method 300 according to an embodiment of this application. The method 300 may be applied to the scenarios shown in FIG. 1 and FIG. 2, and certainly may also be applied to another communication scenario. This is not limited in the embodiments of this application.

It should be understood that, in the embodiments of this application, an example in which methods in the embodiments are performed by a terminal device and a network device is used to describe the methods in the embodiments. As an example instead of a limitation, the methods may alternatively be performed by a chip used in a terminal device and a chip used in a base station. The terminal device may be a vehicle, a vehicle-mounted device, a mobile phone terminal, or the like in V2X communication.

As shown in FIG. 3, the method 300 shown in FIG. 3 may include step S310 to step S330. The following describes each step in the method 300 in detail with reference to FIG. 3.

S310: A first terminal device sends a reference signal to a second terminal device. Correspondingly, the second terminal device receives the reference signal. The reference signal is used to determine channel state information of a first sidelink, and the first sidelink is a direct link from the first terminal device to the second terminal device.

S320: The second terminal device determines the channel state information of the first sidelink based on the reference signal.

S330: The second terminal device sends, to the first terminal device, the channel state information of the first sidelink. Correspondingly, the first terminal device receives, from the second terminal device, the channel state information of the first sidelink.

Figure 4:
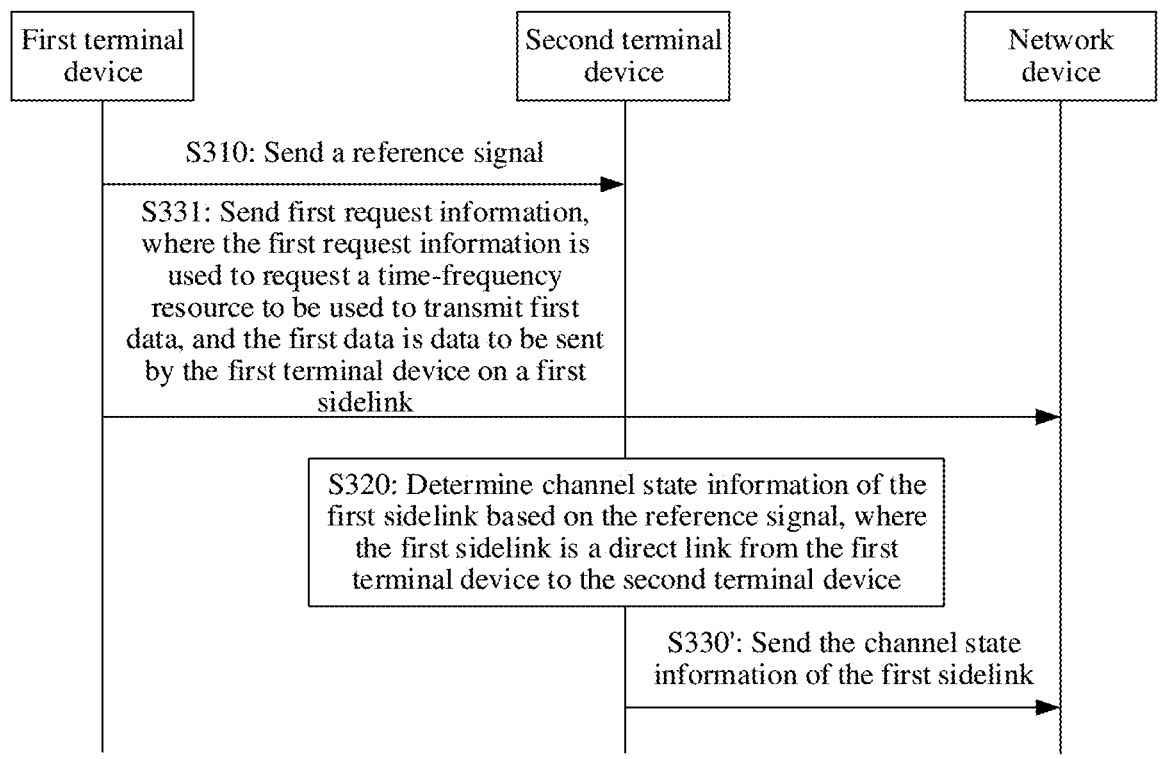
FIG. 4 is a schematic interaction diagram of another example of a sidelink quality measurement method according to an embodiment of this application.

Optionally, step S330 may be replaced with S330'. In S330', the second terminal device sends, to a network device, the channel state information of the first sidelink. In this possible implementation shown in FIG. 4, where FIG. 4 is a schematic interaction diagram of a sidelink quality measurement method according to some embodiments of this application, the method 300, in some embodiments, may further include S331: The first terminal device sends first request information to the network device, where the first request information is used to request a time-frequency resource to be used to transmit first data, and the first data is data to be sent by the first terminal device on the first sidelink. It should be understood that step S331 and step S310 are not subject to a necessary sequence. The first terminal device may send the first request message to the network device before sending the reference signal, or the terminal device may send the first request message to the network device after sending the reference signal.

Figure 5:
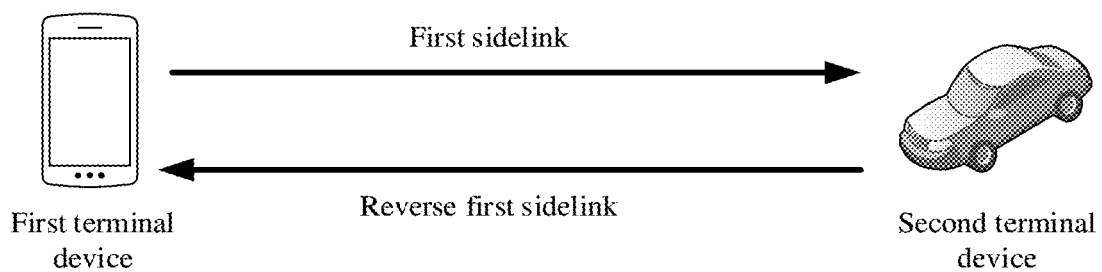
FIG. 5 is a schematic diagram of a first sidelink according to an embodiment of this application.

Specifically, when the first terminal device needs to send data to the second terminal device, the channel state information of the direct link (the first sidelink) from the first terminal device to the second terminal device needs to be determined. The first sidelink is a link used by the first terminal device to send data or control information to the second terminal device, namely, a direct link from the first terminal device to the second terminal device. The first sidelink is directional, and is a link on which the first terminal device sends data or control information to the second terminal device. The first sidelink is different from a direct link on which the second terminal device sends data or control information to the first terminal device. For example, FIG. 5 is a schematic diagram of the first sidelink according to an embodiment of this application. The first sidelink is from the first terminal device to the second terminal device. A direct link from the second terminal device to the first terminal device is different from the first sidelink. For example, the direct link from the second terminal device to the first terminal device may be referred to as a reverse first sidelink, so as to make a distinction.

When the first terminal device needs to determine the channel state information of the first sidelink, the first terminal device obtains configuration information of the reference signal of the first sidelink. The reference signal may include a reference signal used for channel quality measurement, such as a cell-specific reference signal, a CSI-RS, or a DMRS. The configuration information of the reference signal may include a sending period, a sending time-frequency position, and the like of the reference signal. The first terminal device may obtain the configuration information of the reference signal from the network device, and send the configuration information of the reference signal to the second terminal device.

Optionally, the network device may also notify the configuration information of the reference signal to the first terminal device and the second terminal device.

After both the first terminal device and the second terminal device learn of the configuration information of the reference signal, in S310, the first terminal device may send the reference signal to the second terminal device based on the configuration information of the reference signal. Correspondingly, the second terminal device receives the reference signal based on the configuration information of the reference signal. The reference signal is used by the second terminal device to measure channel quality of the first sidelink.

In S320, the second terminal device determines the channel state information of the first sidelink based on the detected reference signal. The channel state information of the first sidelink may include a CQI of the first sidelink, a PMI of the first sidelink, a PTI of the first sidelink, an RI of the first sidelink, and the like. This is not limited in this embodiment of this application.

In S330, after determining the channel state information of the first sidelink, the second terminal device sends, to the first terminal device, the channel state information of the first sidelink. Specifically, the second terminal device may feed back, to the first terminal device, the channel state information of the first sidelink by using sidelink control information (SCI) of the first sidelink. Optionally, the SCI may further include an acknowledgement (ACK)/negative acknowledgement (NACK) sent by the second terminal device to the first terminal to indicate whether data sent by the first terminal is correctly received.

Optionally, in step S330, after determining the channel state information of the first sidelink, the second terminal device may further send, to the network device, the channel state information of the first sidelink. Alternatively, the second terminal device sends the channel state information of the first sidelink only to the network device, and does not send, to the first terminal device, the channel state information of the first sidelink. In other words, step S330 may be replaced with S330'. Specifically, the second terminal device may send, to the network device, the channel state information of the first sidelink by using uplink control information (UCI). After obtaining the channel state information of the first sidelink, the network device may notify the first terminal device of the channel state information of the first sidelink by using downlink control information (DCI). Alternatively, the network device may not notify the first terminal device of the channel state information of the first sidelink.

According to the sidelink quality measurement method provided in this application, CSI measurement can be implemented in SL communication. The first terminal device may obtain the channel state information of the link from the first terminal device to the second terminal device. The channel state information is used, so that efficiency and reliability of data transmission between the first terminal device and the second terminal device can be improved, and user experience can be improved.

Figure 6:
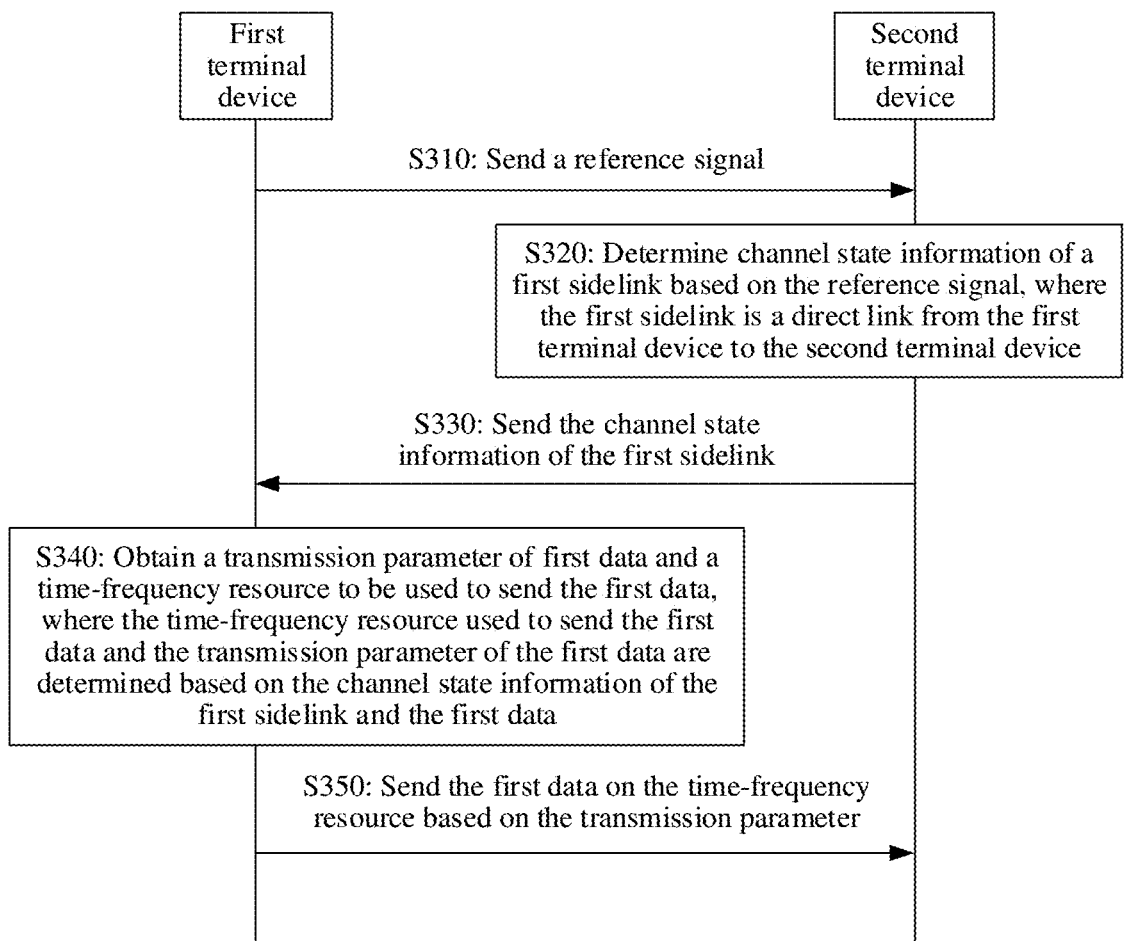
FIG. 6 is a schematic interaction diagram of an example of a sidelink quality measurement method according to an embodiment of this application.

FIG. 6 is a schematic interaction diagram of a sidelink quality measurement method according to some embodiments of this application. In some embodiments, based on the method steps shown in FIG. 3, the method 300 further includes the following steps.

S340: The first terminal device obtains a transmission parameter of first data and a time-frequency resource that is to be used to send the first data, where the time-frequency resource to be used to send the first data and the transmission parameter of the first data are determined based on the channel state information of the first sidelink and the first data.

S350: The first terminal device sends, based on the transmission parameter of the first data, the first data to the second terminal device on the time-frequency resource. Correspondingly, the second terminal device receives the first data sent by the first terminal device.

Specifically, for descriptions of steps S310 to S330 shown in FIG. 6, refer to the foregoing descriptions of steps S310 to S330 in FIG. 3. For brevity, details are not described herein again.

In S340, the first terminal device may obtain the transmission parameter of the first data and the time-frequency resource that is to be used to send the first data to the second terminal device. The time-frequency resource to be used to send the first data and the transmission parameter of the first data are determined based on the first data and the channel state information of the first sidelink. It should be understood that the time-frequency resource to be used to send the first data may be scheduled by the network device to the first terminal device, or may be determined by the first terminal device (scheduled by the first terminal device), or may be granted by the network device after the first terminal device determines the time-frequency resource and then request the network device to grant the time-frequency resource. The scheduled time-frequency resource may be partially different from a time-frequency resource actually used by the first terminal device to send the first data. For example, when the scheduled time-frequency resource is less than a time-frequency resource actually required for sending the first data, the first terminal device sends some of the first data on the scheduled resource, and continues to send remaining first data on a resource scheduled next time.

The time-frequency resource to be used to send the first data is to be used to carry the first data and/or other control information that are/is sent by the first terminal device to the second terminal device. The time-frequency resource to be used to send the first data has a determined time domain range and frequency domain range. In other words, the time-frequency resource to be used to send the first data is a block of resources. A position of the time-frequency resource to be used to send the first data may include a start position of the time-frequency resource and a size of the time-frequency resource, a start position and an end position of the time-frequency resource, or the like. The transmission parameter includes an MCS, a beam-related parameter, or the like of the first data or other control information sent by the first terminal device to the second terminal device.

The second terminal device may also obtain the transmission parameter of the first data and the time-frequency resource that is to be used to send the first data. The second terminal device may correctly receive and demodulate, based on the transmission parameter of the first data and the time-frequency resource, the first data or other control information sent by the first terminal device.

Optionally, after obtaining the transmission parameter of the first data and the position of the time-frequency resource that is to be used to send the first data, the first terminal device may directly send, to the second terminal device, the transmission parameter of the first data and the position of the time-frequency resource that is to be used to send the first data. Alternatively, the first terminal device may send, to the network device, the transmission parameter of the first data and the position of the time-frequency resource that is to be used to send the first data, and the network device sends, to the second terminal device, the transmission parameter of the first data and the position of the time-frequency resource that is to be used to send the first data.

In S350, after obtaining the transmission parameter of the first data and the position of the time-frequency resource that is to be used to send the first data, the first terminal device may send, based on the transmission parameter of the first data, the first data to the second terminal device on the time-frequency resource. Correspondingly, the second terminal device receives, on the time-frequency resource based on the transmission parameter of the first data, the first data, other control information, or the like sent by the first terminal device.

According to the sidelink quality measurement method provided in this application, CSI measurement can be implemented in SL communication. The first terminal device may determine, based on the channel state information of the link from the first terminal device to the second terminal device, the time-frequency resource to be used to send the data to the second terminal device and the transmission parameter, and send the data or control information to the second terminal device based on the transmission parameter and the time-frequency resource. This improves efficiency and reliability of data transmission between the first terminal device and the second terminal device, and improves user experience.

Figure 7:
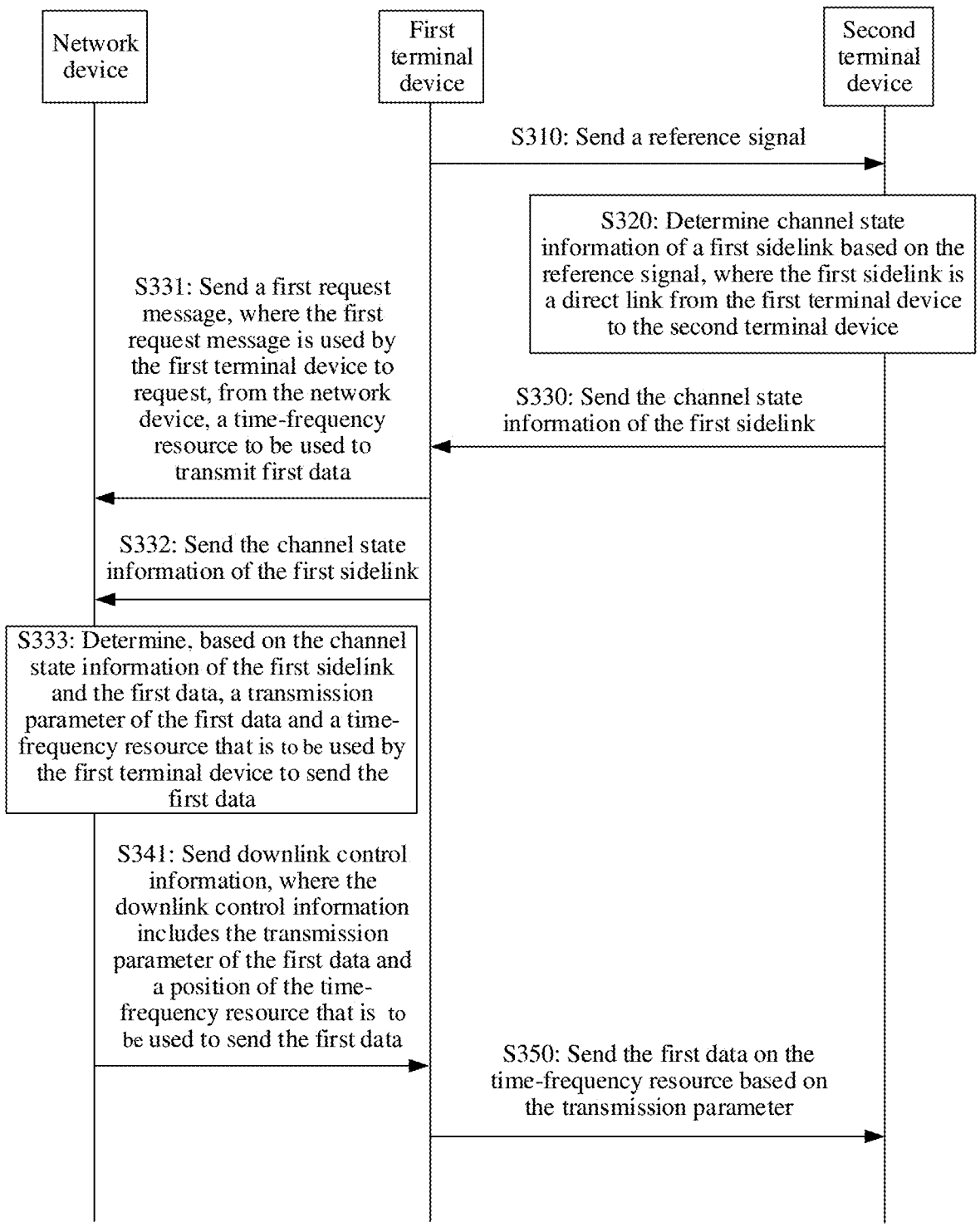
FIG. 7 is a schematic interaction diagram of a sidelink quality measurement method according to another embodiment of this application.

FIG. 7 is a schematic interaction diagram of a sidelink quality measurement method according to some embodiments of this application. In some embodiments, based on the method steps shown in FIG. 6, the method 300 further includes the following steps.

S331: The first terminal device sends a first request message to the network device, where the first request message is used by the first terminal device to request, from the network device, a time-frequency resource to be used to transmit the first data.

S332: After obtaining the channel state information of the first sidelink, the first terminal device sends, to the network device, the channel state information of the first sidelink.

S333: The network device determines, based on the channel state information of the first sidelink and the first data, the transmission parameter of the first data and the time-frequency resource that is to be used by the first terminal device to send the first data.

That the first terminal device obtains a transmission parameter of first data and a time-frequency resource that is to be used to send the first data in step S340 includes:

S341: The first terminal device receives downlink control information from the network device, where the downlink control information includes the transmission parameter of the first data and the position of the time-frequency resource that is to be used to send the first data.

Specifically, for descriptions of steps S310 to S330 and S350 shown in FIG. 7, refer to the foregoing descriptions of steps S310 to S330 and S350. For brevity, details are not described herein again.

In step S331, the first terminal device sends the first request message to the network device, where the first request message is used by the first terminal device to request, from the network device, the time-frequency resource to be used to transmit the first data. That is, the first terminal device may request, from the network device, the time-frequency resource to be used to transmit the first data. Optionally, after the first terminal device obtains the time-frequency resource to be used to send the first data, the first terminal device may determine, based on the time-frequency resource, the transmission parameter for transmitting the first data.

Optionally, the first request information may be further used to request the transmission parameter of the first data. In other words, the network device is requested to determine the transmission parameter of the first data for the first terminal device. In this case, the first terminal device does not need to independently determine the transmission parameter of the first data.

Optionally, the first request information may further include information such as a data amount of the first data, so that the network device allocates, to the first terminal device more accurately, the transmission resource used to transmit the first data.

After the first terminal device obtains the channel state information of the first sidelink, in step S332, the first terminal device may send, to the network device, the channel state information of the first sidelink. Specifically, the first terminal device may send, to the network device, the channel state information of the first sidelink by using UCI. The first terminal device may further send, to the network device, information about the first data that needs to be sent to the second terminal device. The information about the first data may include the data amount of the first data and the like. Information about the data amount may be sent to the network device by using buffer status information (BSI). The BSI includes the information about the data amount of the first data that needs to be sent by the first terminal device to the second terminal device.

Optionally, the network device may alternatively receive, from the second device, the channel state information of the first sidelink. In other words, the first terminal device may not send, to the network device, the channel state information of the first sidelink.

Optionally, a time-frequency resource used by the second terminal device to send, to the first terminal device, the channel state information of the first sidelink is preconfigured by the network device. Therefore, when the second terminal device sends, to the first terminal device, the channel state information of the first sidelink, a network may perform listening on the time-frequency resource on which the channel state information of the first sidelink is to be sent. In other words, the network device may obtain the channel state information of the first sidelink through listening (detection).

It should be understood that the first terminal device may first perform step S331, and then perform step S332, or may first perform step S332, and then perform step S331. This is not limited in this embodiment of this application.

In step S333, after the network device obtains the channel state information of the first sidelink and the BSI, the network device allocates (schedules), based on the channel state information of the first sidelink and the BSI, the time-frequency resource to be used to send the first data by the first terminal device. Optionally, the network device may further determine the transmission parameter of the first data.

In step S341, the network device may notify, by using downlink control information (downlink control information, DCI) or configuration information, the first terminal device of the determined transmission parameter of the first data and the determined position of the time-frequency resource that is to be used to send the first data. The first terminal device may send the first data to the second terminal device on the time-frequency resource based on the transmission parameter of the first data. It should be understood that, based on a specific status of the allocated time-frequency resource in the DCI or the configuration information, the first terminal device may send some of the first data, or all of the first data, or the first data and other data to the second terminal device on the time-frequency resource based on the transmission parameter. This is not limited in the solution of this application.

It should be understood that the network device may determine only the time-frequency resource to be used to send the first data, and then notify the first terminal device of the position of the time-frequency resource to be used to send the first data. The position of the time-frequency resource to be used to send the first data may include a number of a start symbol and a number of a start subcarrier of the time-frequency resource, a quantity of consecutive symbols and a quantity of consecutive subcarriers of the time-frequency resource, and the like. Alternatively, the position of the time-frequency resource to be used to send the first data may include numbers of start and end symbols of the time-frequency resource, subcarrier numbers of the time-frequency resource, and the like. Optionally, the first terminal device may determine the transmission parameter of the first data based on the time-frequency resource to be used to send the first data. In other words, the DCI sent by the network device to the first terminal device may not include the transmission parameter of the first data.

It should be further understood that the DCI may include indication information of the transmission parameter of the first data, for example, may include an index number of the transmission parameter. In other words, the DCI may not directly include the transmission parameter of the first data, but include the indication information of the transmission parameter of the first data.

It should be further understood that, in some embodiments, the time-frequency resource to be used to transmit the first data requested by using the first request message and the time-frequency resource that is to be used to send the first data and that is sent by the network device to the first terminal device by using the DCI may have different sizes or a same size. For example, the time-frequency resource that is to be used to send the first data and that is sent by the network device to the first terminal device by using the DCI and the time-frequency resource that is to be used to transmit the first data and that is requested by using the first request message may be the same in frequency domain and time domain. Alternatively, the time-frequency resource that is to be used to send the first data and that is sent by the network device to the first terminal device by using the DCI may be, in frequency domain and/or time domain, a part of the time-frequency resource that is to be used to transmit the first data and that is requested by the first request message. Alternatively, the time-frequency resource that is to be used to transmit the first data and that is requested by the first request message may be, in frequency domain and/or time domain, a part of the time-frequency resource that is to be used to send the first data and that is sent by the network device to the first terminal device by using the DCI. This is not limited in this embodiment of this application.

Optionally, the network device may further notify the second terminal device of the transmission parameter of the first data and the position of the time-frequency resource that is to be used to send the first data. The second terminal device receives, on the time-frequency resource based on the transmission parameter of the first data, the first data or other control information sent by the first terminal device.

In the manner in which the network device determines the transmission parameter of the first data and the time-frequency resource that is to be used to send the first data, and notifies the first terminal device of the determined transmission parameter of the first data and the determined time-frequency resource that is to be used to send the first data, the time-frequency resource to be used to send the first data and the transmission parameter of the first data are relatively accurate. This greatly avoids a conflict between a data transmission resource on another sidelink and the time-frequency resource for sending the first data and the transmission parameter of the first data, to further improve efficiency and accuracy of sending data by the first terminal device to the second terminal device.

It should be noted that, after determining the channel state information of the first sidelink, the second terminal device may further send, to the network device, the channel state information of the first sidelink. Therefore, the second terminal device may not perform step S330. In other words, the second terminal device does not need to feed back, to the first terminal device, the channel state information of the first sidelink. The first terminal device may not perform step S332. That is, the first terminal device may perform only step S310, step S331, step S341, and step S350. By performing the several steps, the first terminal device may obtain the transmission parameter of the first data and the position of the time-frequency resource that is to be used to send the first data, and send the first data to the second terminal device on the time-frequency resource based on the transmission parameter of the first data.

Figure 8:
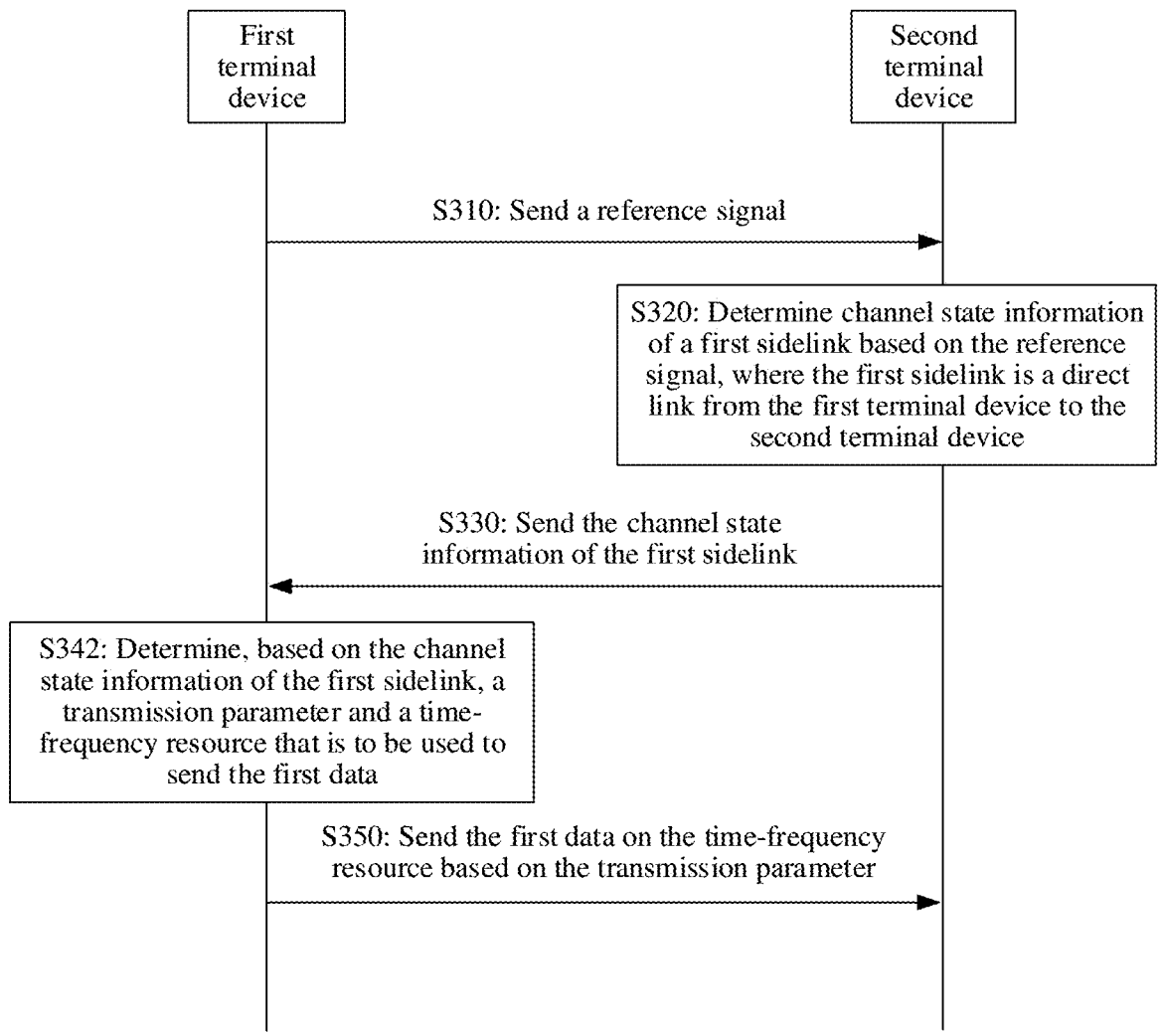
FIG. 8 is a schematic interaction diagram of a sidelink quality measurement method according to another embodiment of this application.

In another embodiment, FIG. 8 is a schematic interaction diagram of a sidelink quality measurement method according to some embodiments of this application. In some embodiments, that the first terminal device obtains a transmission parameter of first data and a time-frequency resource that is to be used to send the first data in step S340 of the method shown in FIG. 6 includes the following step.

S342: The first terminal device determines, based on the channel state information of the first sidelink, the transmission parameter of the first data and the time-frequency resource that is to be used to send the first data.

Specifically, for descriptions of steps S310 to S330 and S350 shown in FIG. 8, refer to the foregoing descriptions of steps S310 to S330 and S350. For brevity, details are not described herein again.

After the first terminal device obtains the channel state information of the first sidelink, in step S342, the first terminal device may determine, based on the channel state information of the first sidelink and the information (for example, the BSI) about the first data that needs to be sent to the second terminal device, the transmission parameter of the first data and the time-frequency resource that is to be used to send the first data. After determining the transmission parameter of the first data and the position of the time-frequency resource that is to be used to send the first data, the first terminal device may send the first data to the second terminal device on the time-frequency resource based on the transmission parameter of the first data. The first terminal device may further notify the second terminal device of the determined transmission parameter of the first data and the determined time-frequency resource for sending the first data.

In the manner in which the first terminal device determines the transmission parameter of the first data and the time-frequency resource that is to be used to send the first data, because the first terminal device does not need to send, to the network device, the channel state information of the first sidelink, signaling overheads can be reduced, and resource utilization can be improved.

Figure 9:
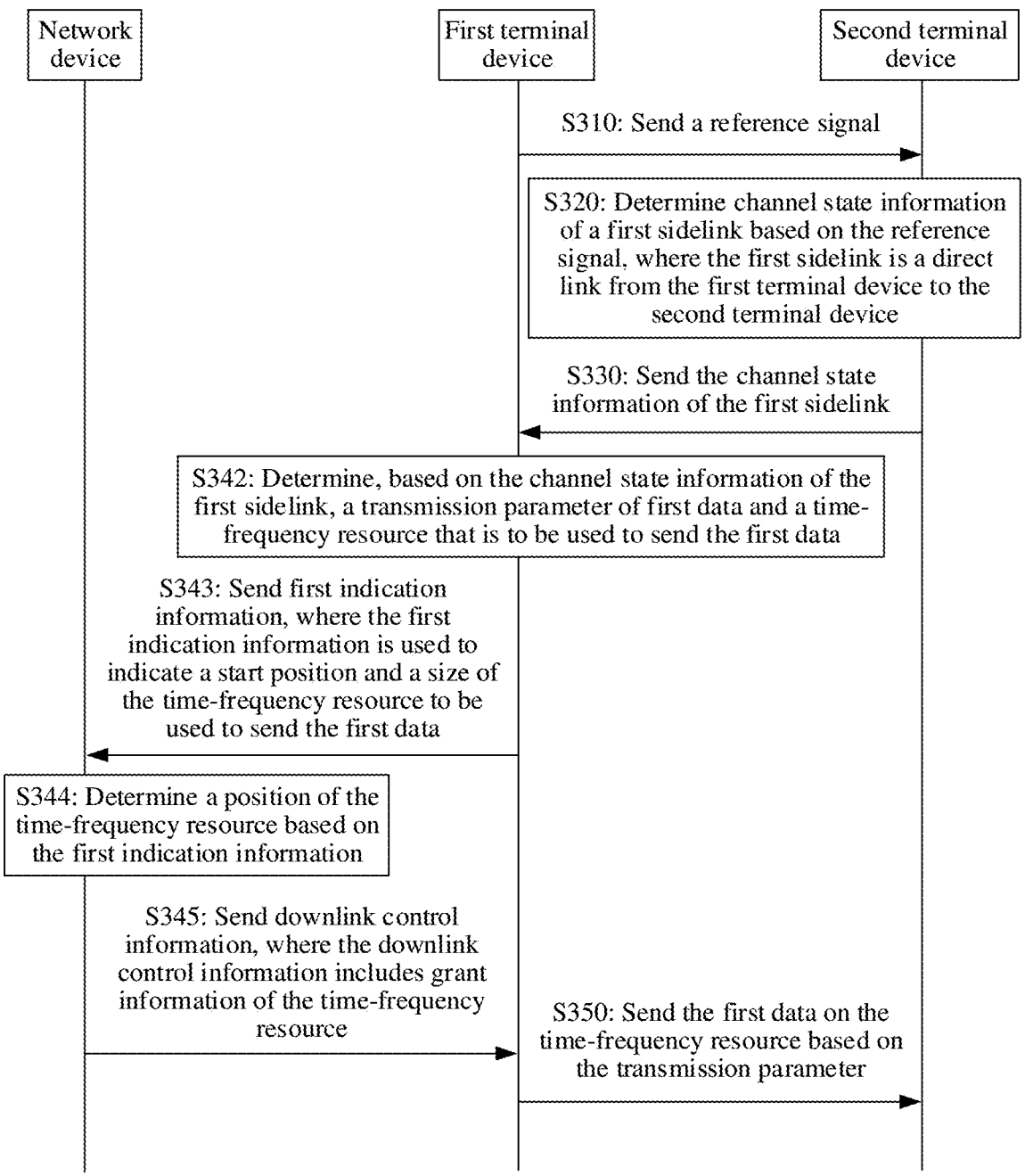
FIG. 9 is a schematic interaction diagram of a sidelink quality measurement method according to another embodiment of this application.

FIG. 9 is a schematic interaction diagram of a sidelink quality measurement method according to some embodiments of this application. In some embodiments, based on the method shown in FIG. 6, that the first terminal device obtains a transmission parameter of first data and a time-frequency resource that is to be used to send the first data in step S340 includes the following steps.

S342: The first terminal device determines, based on the channel state information of the first sidelink, the transmission parameter of the first data and the time-frequency resource that is to be used to send the first data.

S343: The first terminal device sends first indication information to the network device, where the first indication information is used to indicate a start position and a size of the time-frequency resource to be used to send the first data.

S344 (optional): The network device determines a time-frequency position of the time-frequency resource based on the first indication information.

S345: The network device sends downlink control information to the first terminal device, where the downlink control information includes grant information of the time-frequency resource, and the grant information is used to indicate the first terminal device to send the first data on the time-frequency resource to be used to send the first data. Correspondingly, the first terminal device receives the downlink control information sent by the network device.

Specifically, for descriptions of steps S310 to S330 and S350 shown in FIG. 9, refer to the foregoing descriptions of steps S310 to S330 and S350. For brevity, details are not described herein again.

After the first terminal device obtains the channel state information of the first sidelink, in step S342, the first terminal device may determine, based on the channel state information of the first sidelink and the information (for example, the BSI) about a data amount of the first data that needs to be sent to the second terminal device, the transmission parameter of the first data and the position of the time-frequency resource that is to be used to send the first data. After the position of the time-frequency resource to be used to send the first data and the transmission parameter of the first data are determined, further, to ensure reliability of data transmission, in step S343, the first terminal device may send the first indication information to the network device. The first indication information is used to indicate the start position and the size of the time-frequency resource, or the first indication information is used to indicate the start position and an end position of the time-frequency resource. For example, the start position may include a start position in time domain and a start position in frequency domain. The start position in time domain may be a number of a start symbol, a start slot, or the like, and the start position in frequency domain may be a number of a start subcarrier, an absolute value of a start frequency, or the like. The size of the time-frequency resource to be used to send the first data may include a size in time domain and a size in frequency domain. The size in time domain may be a quantity of symbols or slots, and the size in frequency domain may be a frequency range or the like. It should be understood that after the first terminal device determines the time-frequency resource to be used to send the first data, the transmission parameter of the first data may be determined based on the position of the time-frequency resource to be used to send the first data and the like. For example, the first indication information may be indication information of the time-frequency resource to be used to send the first data (for example, time-frequency indicator, TFI). In S344, after receiving the first indication information, the network device may determine, based on the first indication information, the time-frequency position of the time-frequency resource to be used to send the first data. For example, in time domain, a time domain position may be a number of a start slot or symbol of the time-frequency resource and a number of an end slot or symbol of the time-frequency resource. In frequency domain, a frequency domain position may be a width of a subcarrier or a frequency domain range occupied by the time-frequency resource to be used to send the first data, or the like. After determining the time-frequency position of the time-frequency resource to be used to send the first data, the network device determines, based on a status of resources used by a plurality of terminal devices in coverage of the network device to transmit data, whether to grant the first terminal device, that is, whether to allow the first terminal device to use the time-frequency resource that is determined by the first terminal device and that is to be used to send the first data.

Specifically, when the time-frequency resource to be used to send the first data does not conflict with a transmission resource to be used by another terminal device, the network device may grant the first terminal device, that is, allow the first terminal device to use the time-frequency resource that is determined by the first terminal device and that is to be used to send the first data. In step S345, the network device sends the downlink control information to the first terminal device, where the downlink control information includes the grant information of the time-frequency resource to be used to send the first data, and the grant information is used to indicate the first terminal device to send the data on the time-frequency resource to be used to send the first data. After receiving the downlink control information sent by the network device, the first terminal device may send the data to the second terminal device on the time-frequency resource based on the transmission parameter of the first data.

When the time-frequency resource to be used to send the first data conflicts with a transmission resource to be used by another terminal device, the network device may not grant the first terminal device, that is, does not allow the first terminal device to use the time-frequency resource that is determined by the first terminal device and that is to be used to send the first data. In this case, the network device may reallocate, to the first terminal device based on the channel state information of the first sidelink and the BSI, a time-frequency resource to be used to transmit the first data, and determine the transmission parameter. In step S345, the network device sends the downlink control information to the first terminal device, where the downlink control information may include position information of a reallocated time-frequency resource to be used to send the first data and the determined transmission parameter of the first data.

Optionally, in a possible implementation, the first indication information may be further used to indicate only the size of the time-frequency resource to be used to send the first data. The size of the time-frequency resource to be used to send the first data may be determined by the first terminal device based on the BSI. In this case, in S344, after receiving the first indication information, the network device determines the time-frequency position of the time-frequency resource based on the size of the time-frequency resource to be used to send the first data. For example, the size of the time-frequency resource to be used to send the first data is 10 physical resource blocks (physical resource block, PRB). The network device needs to determine a start position and an end position of the 10 PRBs based on the first indication information. In other words, the network device needs to determine the time-frequency position of the time-frequency resource based on the size of the time-frequency resource. After the network device determines the time-frequency position of the time-frequency resource to be used to send the first data, in step S345, the network device sends the downlink control information to the first terminal device, where the downlink control information may include information about the time-frequency position of the time-frequency resource to be used to send the first data. After receiving the downlink control information sent by the network device, the first terminal device may determine the time-frequency position of the time-frequency resource to be used to send the first data. The first terminal device may send the first data to the second terminal device on the time-frequency resource based on the transmission parameter of the first data.

In the manner in which the first terminal device determines the time-frequency resource to be used to send the first data, and applies to the network device for a grant, because the first terminal device does not need to send, to the network device, the channel state information of the first sidelink, signaling overheads can be reduced, and resource utilization can be improved. In addition, granted by the network device, the time-frequency resource to be used to send the first data and the transmission parameter of the first data are relatively accurate. This greatly avoids a conflict between the time-frequency resource for sending the first data and a data transmission resource on another sidelink, to further improve efficiency and accuracy of sending data by the first terminal device to the second terminal device.

Figure 10:
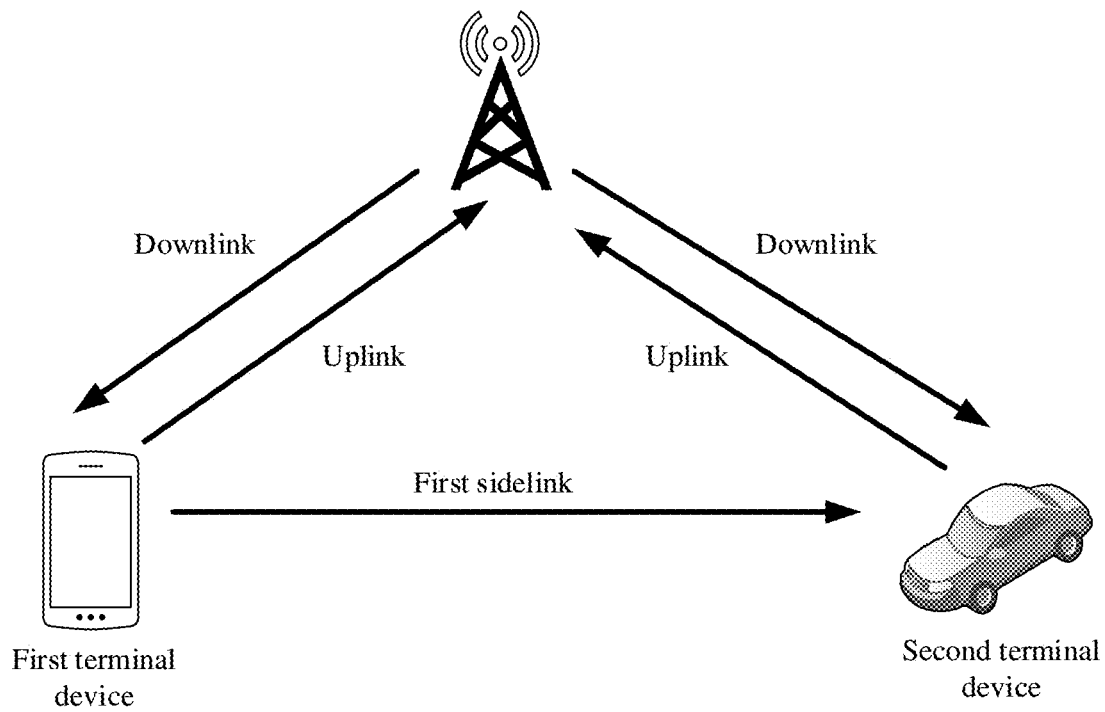
FIG. 10 is a schematic diagram of links between a first terminal device, a network device, and a second terminal device according to an embodiment of this application.

FIG. 10 is a schematic diagram of links between a first terminal device, a network device, and a second terminal device according to an embodiment of this application. In step S332, as shown in FIG. 10, the first terminal device sends, to the network device, the channel state information of the first sidelink. There is still a downlink between the first terminal device and the network device, the downlink is a link used by the network device to send data or control information to the first terminal device, and an uplink is a link used by the first terminal device to send data or control information to the network device. The first terminal device further sends, to the network device, channel state information of the downlink. Therefore, the network device needs to distinguish between the channel state information of the first sidelink and the channel state information of the downlink that are sent by the first terminal device. The following distinguishing manners may be used:

Manner 1: The network device configures different time-frequency resources for the channel state information of the first sidelink and the channel state information of the downlink that are sent by the first terminal device. To be specific, the first terminal device sends, to the network device, the channel state information of the first sidelink on the first time-frequency resource, a resource used by the first terminal device to send, to the network device, the channel state information of the downlink is a second time-frequency resource, and the first time-frequency resource and the second time-frequency resource are different in time domain and/or frequency domain. Because the time-frequency resources used to send the channel state information of the first sidelink and the channel state information of the downlink are different, the network device may perform detection on different time-frequency resources, and distinguish between the channel state information of the first sidelink and the channel state information of the downlink based on information detected on the different time-frequency resources. For example, the network device detects the channel state information of the first sidelink in a slot 2, and detects the channel state information of the downlink in a slot 3. Frequency domain resources corresponding to the slot 2 and the slot 3 may be the same or may be different. The network device configures different time-frequency resources for sending the channel state information of the first sidelink and sending the channel state information of the downlink, to distinguish between the channel state information of the first sidelink and the channel state information of the downlink. A determining result is relatively accurate and this is easy to implement. In addition, other information does not need to be introduced into the channel state information of the first sidelink and the channel state information of the downlink, to reduce resource consumption and improve resource utilization.

Manner 2: Different identifiers carried in the channel state information of the first sidelink and the channel state information of the downlink may be used for distinguishing. Specifically, the first sidelink is a link used by the first terminal device to send data or control information to the second terminal device, and the downlink is a link used by the first terminal device to send data or control information to the network device. Both the first terminal device and the second terminal device are within coverage of the network device. In other words, the network device learns of identifiers of the first terminal device and the second terminal device in advance. Therefore, the channel state information of the first sidelink may include the identifier of the second terminal device, and the channel state information of the downlink does not carry the identifier of the second terminal device. After detecting the two types of channel state information, the network device may further perform distinguishing based on whether the channel state information carries the identifier of the second terminal device. Channel state information that carries the identifier of the second terminal device is the channel state information of the first sidelink, and channel state information that carries the identifier of the second terminal device is the channel state information of the downlink. The channel state information of the first sidelink and the channel state information of the downlink carry identifiers of different terminal devices, to distinguish between the channel state information of the first sidelink and the channel state information of the downlink, so that a determining result is relatively accurate. This improves efficiency of distinguishing between channel state information of different links by the network device, and further improves efficiency of determining, by the network device, the transmission parameter of the first data and the time-frequency resource that is to be used to send the first data.

It should be understood that, in this embodiment of this application, in addition to distinguishing, in the foregoing two manners, between the channel state information of the first sidelink and the channel state information of the downlink that are sent by the first terminal device, the network device may further distinguish, in another manner, between the channel state information of the first sidelink and the channel state information of the downlink that are sent by the first terminal device. For example, the channel state information of the first sidelink and the channel state information of the downlink are scrambled by using different signals, to distinguish between the channel state information of the first sidelink and the channel state information of the downlink. In addition, the foregoing plurality of manners of distinguishing between the channel state information of the first sidelink and the channel state information of the downlink that are sent by the first terminal device may be used separately, or may be used in any possible combination. This is not limited in this embodiment of this application.

It should be further understood that the links shown in FIG. 10 are merely examples, and should not constitute any limitation on this embodiment of this application. For example, there may further be more terminal devices on the network links. Alternatively, there may be more terminal devices that have sidelinks with the first terminal device, and there may be more terminal devices that have sidelinks with the second terminal device. This is not limited in this embodiment of this application.

In the embodiments of this application, in a process in which the second terminal device sends, to the network device, the channel state information of the first sidelink, as shown in FIG. 10, there is also a downlink between the second terminal device and the network device, the downlink is a link used by the network device to send data or control information to the second terminal device, and the second terminal device also sends, to the network device, channel state information of the downlink. Therefore, the network device also needs to distinguish between the channel state information of the first sidelink and the channel state information of the downlink that are sent by the second terminal device. A distinguishing manner is similar to the foregoing manner in which the network device distinguishes between the channel state information of the first sidelink and the channel state information of the downlink that are sent by the first terminal device. In other words, time-frequency resources used by the second terminal device to send, to the network device, the channel state information of the first sidelink and the channel state information of the downlink are different. The second terminal device sends, to the network device, the channel state information of the first sidelink on a third time-frequency resource, a resource used by the second terminal device to send, to the network device, the channel state information of the downlink is a fourth time-frequency resource, and the third time-frequency resource and the fourth time-frequency resource are different in time domain and/or frequency domain. Alternatively, to distinguish between the channel state information of the first sidelink and the channel state information of the downlink, the channel state information of the first sidelink sent by the second terminal device to the network device may carry the identifier of the first terminal device, and the channel state information of the downlink sent by the second terminal device to the network device does not carry the identifier of the first terminal device. This is not limited in this embodiment of this application.

Figure 11:
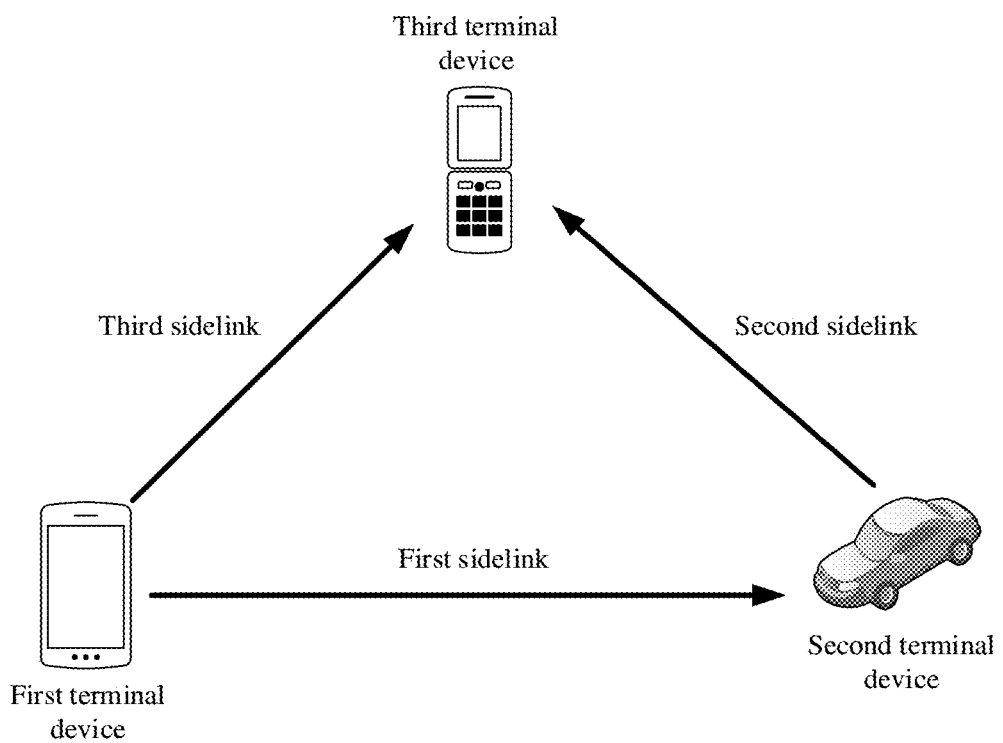
FIG. 11 is a schematic diagram of multi-hop links between a first terminal device, a second terminal device, and a third terminal device according to an embodiment of this application.
Figure 12:
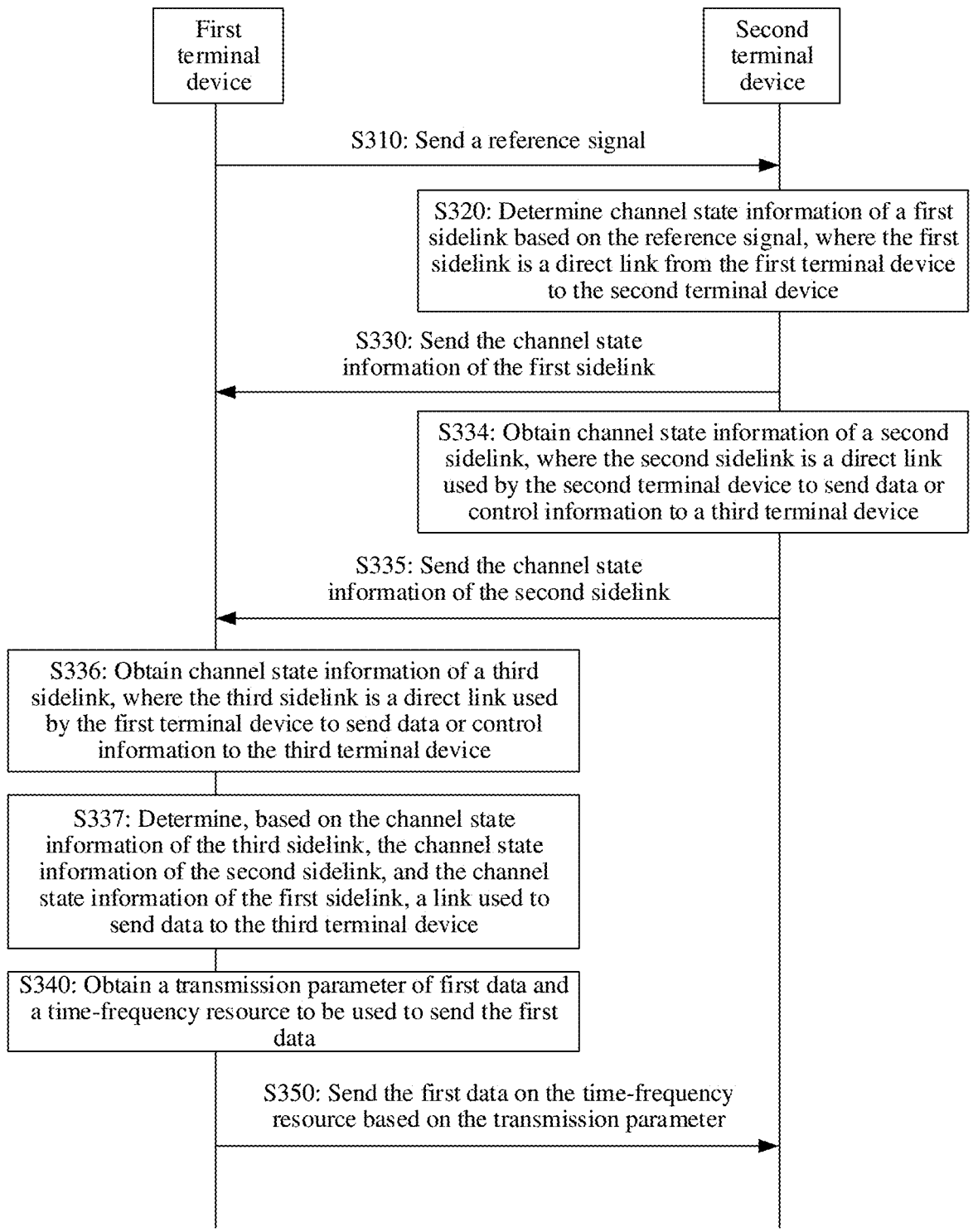
FIG. 12 is a schematic interaction diagram of a sidelink quality measurement method according to another embodiment of this application.

FIG. 11 is a schematic diagram of multi-hop links between a first terminal device, a second terminal device, and a third terminal device according to an embodiment of this application. As shown in FIG. 11, a direct link used by the first terminal device to send data or control information to the second terminal device is a first sidelink, a direct link used by the second terminal device to send data or control information to the third terminal device is a second sidelink, and a direct link used by the first terminal device to send data or control information to the third terminal device is a third sidelink. In this case, FIG. 12 is a schematic interaction diagram of a sidelink quality measurement method according to some embodiments of this application. The method may be based on the method steps shown in FIG. 6. In some embodiments, the method 300 further includes the following steps:

S334: The second terminal device obtains channel state information of the second sidelink.

S335: The second terminal device sends, to the first terminal device, the channel state information of the second sidelink.

S336: The first terminal device obtains channel state information of the third sidelink, where the third sidelink is a direct link from the first terminal device to the third terminal device.

S337: The first terminal device determines, based on the channel state information of the third sidelink, the channel state information of the second sidelink, and the channel state information of the first sidelink, a link used to send data to the third terminal device. Further, after determining the link used to send the data to the third terminal device, the first terminal device may further determine a time-frequency resource to be used to send the data to the third terminal device and a transmission parameter.

Specifically, as shown in FIG. 11, the second terminal device may further send a reference signal to the third terminal device, and the third terminal device determines the channel state information of the second sidelink based on the reference signal sent by the second terminal device. The third terminal device may send, to the second terminal device, the channel state information of the second sidelink. The second sidelink is a direct link from a second terminal device to the third terminal device.

The first terminal device may further send a reference signal to the third terminal device, and the third terminal device determines the channel state information of the third sidelink based on the reference signal, and sends, to the first terminal device, the channel state information of the third sidelink. The third sidelink is a direct link from the first terminal device to the third terminal device. Alternatively, the third terminal device sends, to the network device, the channel state information of the third sidelink, and the network device forwards, to the first terminal device, the channel state information of the third sidelink.

For descriptions of steps S310, S320, S330, S340, and S350 shown in FIG. 12, refer to descriptions of corresponding steps in the foregoing embodiments. For brevity, details are not described herein again.

In step S334, the second terminal device obtains the channel state information of the second sidelink in the following several manners:

Manner 1: The third terminal device sends, to the network device, the channel state information of the second sidelink, and the network device forwards, to the second terminal device, the channel state information of the second sidelink. In other words, the third terminal device may not send, to the second terminal device, the channel state information of the second sidelink. After obtaining the channel state information of the second sidelink, the second terminal device may perform step S335: The second terminal device sends, to the first terminal device, the channel state information of the second sidelink.

Manner 2: The third terminal device directly sends, to the second terminal device, the channel state information of the second sidelink, and the second terminal device sends, to the first terminal device, the channel state information of the second sidelink.

Optionally, when the second terminal device sends, to the first terminal device, the channel state information of the first sidelink and the channel state information of the second sidelink, the channel state information of the first sidelink and the channel state information of the second sidelink may be separately sent by using different signaling (information), or the channel state information of the first sidelink and the channel state information of the second sidelink may be sent by using a same piece of information (signaling). This is not limited in this embodiment of this application.

Optionally, the third terminal device may alternatively directly send, to the first terminal device, the channel state information of the second sidelink. In other words, the third terminal device may neither need to send, to the second terminal device, the channel state information of the second sidelink, nor need to send, to the network device, the channel state information of the second sidelink.

Optionally, whether the second terminal device needs to send, to the first terminal device, the channel state information of the second sidelink may be preconfigured for the second terminal device. In a possible implementation, the second terminal device may determine, based on a preconfiguration or predefinition of the network device or a configuration of the second terminal device, whether to send, to the first terminal device, the channel state information of the second sidelink. In another possible implementation, the second terminal device may further obtain link quality of the second sidelink based on the reference signal sent by the second terminal device to the third terminal device, and then determine whether the link quality of the second sidelink is greater than or equal to a preset first threshold. When the link quality of the second sidelink is greater than or equal to the first threshold, it is determined that the channel state information of the second sidelink needs to be sent to the first terminal device. In this case, the second terminal device generates the channel state information of the second sidelink, and sends, to the first terminal device, the channel state information of the second sidelink. When the link quality of the second sidelink is less than the first threshold, it is determined not to send, to the first terminal device, the channel state information of the second sidelink. In this case, the second terminal device may not generate the channel state information of the second sidelink. Whether the channel state information of the second sidelink needs to be sent to the first terminal device is determined in the foregoing manner. This manner is flexible, and can improve resource utilization.

Optionally, feeding back, by the second terminal device to the first terminal device, both the channel state information of the first sidelink and a channel state of a sidelink between the second terminal device and another terminal device may be triggered by the reference signal sent by the first terminal device to the second terminal device. For example, when the first terminal device sends the reference signal to the second terminal device, the second terminal device determines that both the channel state information of the first sidelink and the channel state information of the second sidelink need to be fed back to the first terminal device.

Optionally, whether the third terminal device needs to send, to the first terminal device, the second terminal device, or the network device, the channel state information of the third sidelink may also be preconfigured for the third terminal device. This is similar to preconfiguring whether the second terminal device needs to send, to the first terminal device, the channel state information of the second sidelink. For brevity, details are not described herein again.

In step S336, the first terminal device may further send the reference signal to the third terminal device, and the third terminal device determines the channel state information of the third sidelink based on the reference signal, and sends, to the first terminal device, the channel state information of the third sidelink. The third sidelink is a direct link from the first terminal device to the third terminal device. Alternatively, the third terminal device sends, to the network device, the channel state information of the third sidelink, and the network device forwards, to the first terminal device, the channel state information of the third sidelink.

The first terminal device may further receive the channel state of the third sidelink that is sent by the third terminal device. That is, the first terminal device obtains a channel state of the first sidelink from the first terminal device to the second terminal device, a channel state of the third sidelink from the first terminal device to the third terminal device, and a channel state of the second sidelink from the second terminal device to the third terminal device. Therefore, when the first terminal device needs to send data or control information to the third terminal device, the first terminal device may determine a transmission link based on quality of the foregoing three links.

In step S337, the first terminal device determines, based on the channel state information of the third sidelink, the channel state information of the second sidelink, and the channel state information of the first sidelink, the link used to send data to the third terminal device. For example, when the quality of the first sidelink and the second sidelink are relatively good, and the quality of the third sidelink is poor, data or control information may be sent to the third terminal device in such a manner: the first terminal device→the second terminal device→the third terminal device. When the quality of the first sidelink and/or the quality of the second sidelink are/is poor, and the quality of the third sidelink is relatively good, the data or the control information may be sent to the third terminal device in such a manner: the first terminal device→the third terminal device. In this way, a plurality of links can be flexibly used to improve data transmission reliability and efficiency. Further, after determining the link used to send the data to the third terminal device, the first terminal device may further determine a time-frequency resource to be used to send the data to the third terminal device and a transmission parameter.

Optionally, the network device may alternatively determine, based on the channel state information of the third sidelink, the channel state information of the second sidelink, and the channel state information of the first sidelink, the link used by the first terminal device to send the data to the third terminal device, and notify the first terminal device of information about the link. Optionally, the network may alternatively determine a time-frequency resource to be used to send the data by the first terminal device to the third terminal device and a transmission parameter, and notify the first terminal device of the time-frequency resource and the transmission parameter.

The first terminal device receives the channel state of the third sidelink that is sent by the third terminal and the channel state of the first sidelink and/or the channel state information of the second sidelink that are/is sent by the second terminal. To be specific, two or more terminal devices adjacent to the first terminal device each send, to the first terminal device, channel state information of a link between the two or more terminal devices and the first terminal device. In addition, the first terminal device may further send, to the network device, channel state information of a sidelink between the first terminal device and another terminal device. In this case, the following two types of information need to be distinguished:

First, the channel state information of the sidelink and a channel state of a downlink that are sent by the first terminal device to the network device are distinguished. For a distinguishing manner, refer to the foregoing specific descriptions of the manner 1 and the manner 2. Details are not described herein again.

Second, after the network device distinguishes between the channel state information of the sidelink and the channel state of the downlink, the first terminal device may send channel state information of a plurality of sidelinks to the network device, for example, the channel state information of the first sidelink and the channel state information of the second sidelink. Therefore, the network device further needs to distinguish between the channel state information of the plurality of sidelinks, and may distinguish between the channel state information of the plurality of sidelinks by using different terminal device identifiers or different transmission resources carried in channel state information of different sidelinks.

For example, the network device detects channel state information of a sidelink in a slot 2, and detects channel state information of a downlink in a slot 3. Further, the channel state information of the sidelink in the slot 2 includes the channel state information of the first sidelink on a symbol 1 to a symbol 3 and the channel state information of the second sidelink on a symbol 5 to a symbol 7.

For another example, the channel state information of the second sidelink that is sent by the first terminal device to the network device carries an identifier of the second terminal device and an identifier of the third terminal device, and the channel state information of the first sidelink that is sent by the first terminal device to the network device does not carry the identifier of the third terminal device. Identifiers of different terminal devices are carried in channel state information of different sidelinks, to distinguish between the channel state information of the different sidelinks.

The first terminal device distinguishes between the channel state of the third sidelink sent by the third terminal device, the channel state of the first sidelink sent by the second terminal device, and/or the channel state information of the second sidelink sent by the second terminal device in a manner similar to the foregoing manner, and may distinguish by using different transmission resources of channel states of different sidelinks, or may distinguish by using identifiers of terminal devices carried in channel states of different sidelinks.

It should be further noted that, when the second terminal device sends, to the first terminal device, the channel state of the first sidelink and the channel state information of the second sidelink, the first sidelink is a link used by the first terminal device to send data or control information to the second terminal device, and the second sidelink is a link used by the second terminal device to send data or control information to the third terminal device. The links are directional. Therefore, the first terminal device further needs to determine whether the second sidelink is a link used by the second terminal device to send data or control information to the third terminal device or a link used by the third terminal device to send data or control information to the second terminal device. To determine a sequence in a link or a direction of a link, the channel state information of the second sidelink that is sent by the second terminal device to the first terminal device includes the identifier of the second terminal device and the identifier of the third terminal device, and a time domain position of a field that carries the identifier of the second terminal device is before a time domain position of a field that carries the identifier of the third terminal device. In other words, a sequence of the identifier of the second terminal device and the identifier of the third terminal device is used to indicate a link from the second terminal device to the third terminal device (namely, the link used by the second terminal device to send data or control information to the third terminal device). If the time domain position of the field that carries the identifier of the third terminal device is before the time domain position of the field that carries the identifier of the second terminal device, a sequence of the identifier of the third terminal device and the identifier of the second terminal device is used to indicate a link from the third terminal device to the second terminal device (namely, the link used by the third terminal device to send data or control information to the second terminal device). A sequence in a link or a direction of a link is determined by using a sequence of identifiers of terminal devices that are carried in channel state information of a sidelink. A determining result is relatively accurate, and this is easy to implement and saves resources.

It should be understood that, in addition to using the time domain positions of the fields that carry the identifiers of the terminal devices to determine a sequence in a link or a direction of a link, another manner may be used to determine a direction of a link or a sequence in a link. For example, a manner of notifying indication information may be used to determine a sequence in a link or a direction of a link. This is not limited in this embodiment of this application.

It should be further understood that the multi-hop network links shown in FIG. 11 are merely examples, and should not constitute any limitation on this embodiment of the present invention. For example, there may further be more terminal devices on the multi-hop network links, or there may be more terminal devices that have sidelinks to the first terminal device, or there may be more terminal devices on the data transmission link: the first terminal device→the second terminal device→the third terminal device. This is not limited in this embodiment of this application.

It should be further understood that, in the embodiments of this application, "first", "second", and the like are merely intended to indicate that a plurality of objects are different. For example, the first terminal device and the second terminal device are merely intended to indicate different terminal devices, but should not cause any impact on the terminal devices. The foregoing first, second, and the like should not impose any limitation on the embodiments of this application.

It should be further understood that the foregoing descriptions are merely intended to help a person skilled in the art better understand the embodiments of this application, but are not intended to limit the scope of the embodiments of this application. It is clear that the person skilled in the art may make various equivalent modifications or changes based on the foregoing examples. For example, some steps in the embodiments of the method described above may be unnecessary, some steps may be newly added. Alternatively, any two or more of the foregoing embodiments may be combined. Such a modified, changed, or combined solution also falls within the scope of the embodiments of this application.

It should be further understood that, the foregoing descriptions of the embodiments of this application focus on a difference between the embodiments. For same or similar parts that are not mentioned, refer to each other. For brevity, details are not described herein.

It should be further understood that sequence numbers of the foregoing processes do not mean execution sequences. The execution sequences of the processes should be determined based on functions and internal logic of the processes, and should not constitute any limitation on implementation processes of the embodiments of this application.

It should be further understood that in the embodiments of this application, "presetting" and "predefinition" may be implemented by prestoring, in a device (including, for example, a terminal device and a network device), corresponding code, a corresponding table, or another manner that may be used to indicate related information. A specific implementation is not limited in this application.

It should be understood that division of manners, cases, types, and embodiments in the embodiments of this application are merely for ease of description, but should not constitute any special limitation, and features in various manners, types, cases, and embodiments may be combined when there is no contradiction.

It should be further understood that in the embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

The foregoing describes in detail the sidelink quality measurement methods in the embodiments of this application with reference to FIG. 1 to FIG. 12. The following describes communications apparatuses in the embodiments of this application with reference to FIG. 13 to FIG. 20. It should be understood that the communications apparatuses in FIG. 13 to FIG. 20 can perform the steps of the synchronization methods in the embodiments of this application.

Figure 13:
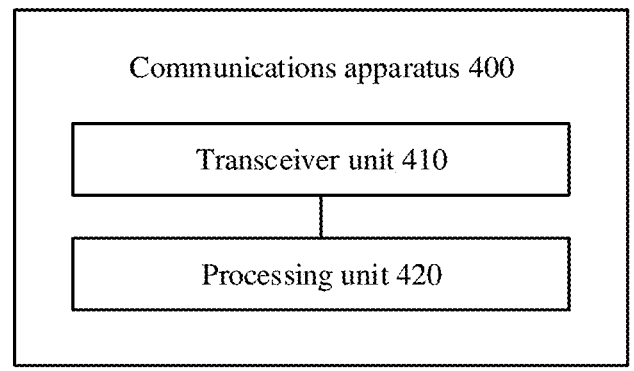
FIG. 13 is a schematic block diagram of a communications apparatus according to an embodiment of this application.

FIG. 13 is a schematic block diagram of a communications apparatus 400 according to an embodiment of this application. The apparatus 400 may correspond to the first terminal device, or may be a chip or a component used in the first terminal device described in the embodiments of the methods. Modules or units in the apparatus 400 are configured to perform actions or processing processes performed by the first terminal device in the foregoing method 300 and the embodiments. As shown in FIG. 13, the communications apparatus 400 may include a transceiver unit 410 and a processing unit 420.

The transceiver unit 410 is configured to send a reference signal to a second terminal device, where the reference signal is used to determine channel state information of a first sidelink, and the first sidelink is a direct link from the first terminal device to the second terminal device.

The transceiver unit 410 is further configured to receive, from the second terminal device, the channel state information of the first sidelink.

Optionally, in some embodiments of this application, the processing unit 420 is configured to obtain a transmission parameter of first data and a time-frequency resource that is to be used to send the first data, where the time-frequency resource to be used to send the first data and the transmission parameter of the first data are determined based on the channel state information of the first sidelink and the first data. The transceiver unit 410 is further configured to send the first data to the second terminal device on the time-frequency resource based on the transmission parameter.

Optionally, in some embodiments of this application, the transceiver unit 410 is further configured to send, to a network device, the channel state information of the first sidelink; send a first request message to the network device, where the first request message is used by the first terminal device to request, from the network device, a time-frequency resource to be used to transmit the first data; and receive downlink control information from the network device, where the downlink control information includes the transmission parameter of the first data and a position of the time-frequency resource that is to be used to send the first data.

Optionally, in some embodiments of this application, the transceiver unit 410 is specifically configured to send, to the network device, the channel state information of the first sidelink on a first time-frequency resource, where the first time-frequency resource and a second time-frequency resource are different in time domain and/or frequency domain, the second time-frequency resource is a resource used by the first terminal device to send, to the network device, channel state information of a downlink, and the downlink is a link from the network device to the first terminal device.

Optionally, in some embodiments of this application, the channel state information of the first sidelink includes an identifier of the second terminal device.

Optionally, in some embodiments of this application, the processing unit 420 is specifically configured to determine the time-frequency resource and the transmission parameter based on the channel state information of the first sidelink and the first data.

Optionally, in some embodiments of this application, the transceiver unit 410 is further configured to send first indication information to a network device, where the first indication information is used to indicate a start position and a size of the time-frequency resource to be used to send the first data; and receive downlink control information from the network device, where the downlink control information includes grant information of the time-frequency resource, and the grant information is used to indicate the first terminal device to send the first data on the time-frequency resource.

Optionally, in some embodiments of this application, the transceiver unit 410 is further configured to receive, from the second terminal device, channel state information of a second sidelink, where the second sidelink is a direct link from the second terminal device to a third terminal device.

It should be understood that for a specific process of performing the foregoing corresponding steps by the units in the apparatus 400, refer to the foregoing related descriptions of the first terminal device in the method embodiments in FIG. 3 to FIG. 11. For brevity, details are not described herein again.

Optionally, the transceiver unit 410 may include a receiving unit (module) and a sending unit (module), configured to perform the steps of receiving information and sending information by the first terminal device in the foregoing method embodiments and the embodiments shown in FIG. 3, FIG. 4, FIG. 6, FIG. 7, FIG. 8, FIG. 9, and FIG. 12. Optionally, the communications apparatus 400 may further include a storage unit 430, configured to store instructions executed by the transceiver unit 410 and the processing unit 420. The transceiver unit 410, the processing unit 420, and the storage unit 430 are in communication connection. The storage unit 430 stores the instructions. The processing unit 420 is configured to execute the instructions stored in the storage unit 430. The transceiver unit 410 is configured to send or receive a specific signal under driving of the processing unit 420.

Figure 14:
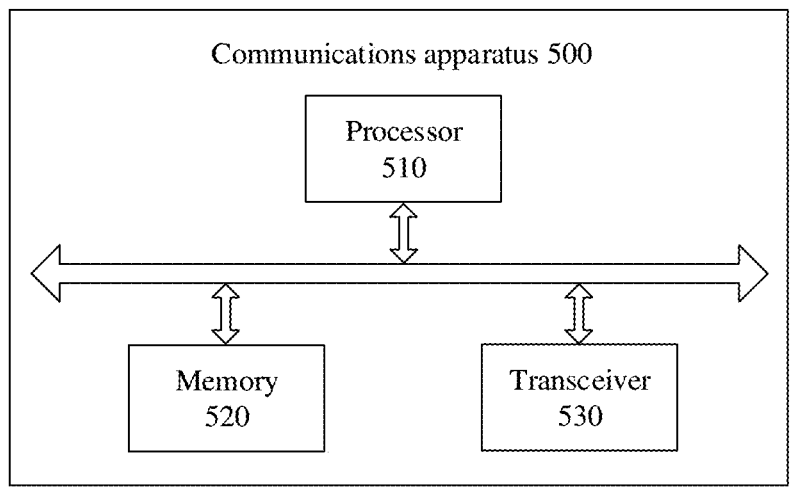
FIG. 14 is a schematic block diagram of a communications apparatus according to another embodiment of this application.

It should be understood that, the transceiver unit 410 may be implemented by a transceiver, and the processing unit 420 may be implemented by a processor. The storage unit may be implemented by a memory. As shown in FIG. 14, a communications apparatus 500 may include a processor 510, a memory 420, and a transceiver 530.

The communications apparatus 400 shown in FIG. 13 or the communications apparatus 500 shown in FIG. 14 can implement steps performed by the first terminal device in the foregoing method embodiments and the embodiments shown in FIG. 3, FIG. 4, FIG. 6, FIG. 7, FIG. 8, FIG. 9, and FIG. 12. For similar descriptions, refer to the descriptions in the foregoing corresponding method. For brevity, details are not described herein again.

It should be further understood that, the communications apparatus 400 shown in FIG. 13 or the communications apparatus 500 shown in FIG. 14 may be a terminal device.

Figure 15:
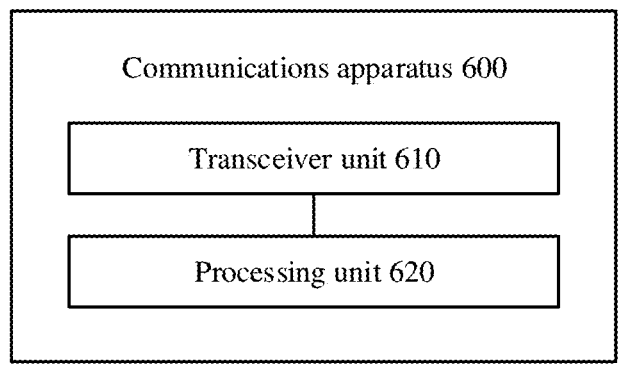
FIG. 15 is a schematic block diagram of a communications apparatus according to an embodiment of this application.

FIG. 15 is a schematic block diagram of a communications apparatus 600 according to an embodiment of this application. The apparatus 600 may correspond to the second terminal device described in the foregoing method embodiments and FIG. 3, FIG. 4, FIG. 6, FIG. 7, FIG. 8, FIG. 9, and FIG. 12, or may be a chip or a component used in the second terminal device. In addition, modules or units in the apparatus 600 are configured to perform actions or processing processes performed by the second terminal device in the foregoing method embodiments and the embodiments shown in FIG. 3, FIG. 4, FIG. 6, FIG. 7, FIG. 8, FIG. 9, and FIG. 12. As shown in FIG. 15, the communications apparatus 600 may include a transceiver unit 610 and a processing unit 620.

The transceiver unit 610 is configured to receive a reference signal from a first terminal device.

The processing unit 620 is configured to determine channel state information of a first sidelink based on the reference signal, where the first sidelink is a direct link from the first terminal device to the second terminal device, and the communications apparatus is the second terminal device, or the second terminal device includes the communications apparatus.

The transceiver unit 610 is further configured to send, to the first terminal device and/or a network device, the channel state information of the first sidelink.

Optionally, in some embodiments of this application, the transceiver unit 610 is specifically configured to send, to the network device, the channel state information of the first sidelink on a third time-frequency resource, where the third time-frequency resource and a fourth time-frequency resource are different in time domain and/or frequency domain, the fourth time-frequency resource is a resource used by the second terminal device to send, to the network device, channel state information of a downlink, and the downlink is a link from the network device to the second terminal device.

Optionally, in some embodiments of this application, the channel state information of the first sidelink includes an identifier of the first terminal device.

Optionally, in some embodiments of this application, the transceiver unit 610 is further configured to send, to the first terminal device, channel state information of the second sidelink, where the second sidelink is a direct link from the second terminal device to a third terminal device.

Optionally, in some embodiments of this application, before the transceiver unit 610 sends, to the first terminal device, the channel state information of the second sidelink, the processing unit 620 is further configured to determine that link quality of the second sidelink is greater than a first threshold.

Optionally, in some embodiments of this application, the channel state information of the second sidelink includes an identifier of the second terminal device and an identifier of the third terminal device, a time domain position of a field that carries the identifier of the second terminal device is before a time domain position of a field that carries the identifier of the third terminal device, and the identifier of the second terminal device and the identifier of the third terminal device are used to indicate the second sidelink.

It should be understood that for a specific process of performing the foregoing corresponding steps by the units in the apparatus 600, refer to the foregoing related descriptions of the second terminal device in the method embodiments in FIG. 3 to FIG. 12. For brevity, details are not described herein again.

Optionally, the transceiver unit 610 may include a receiving unit (module) and a sending unit (module), configured to perform the steps of receiving information and sending information by the second terminal device in the foregoing method embodiments and the embodiments shown in FIG. 3, FIG. 4, FIG. 6, FIG. 7, FIG. 8, FIG. 9, and FIG. 12. Optionally, the communications apparatus 600 may further include a storage unit 630, configured to store instructions executed by the transceiver unit 610 and the processing unit 620. The transceiver unit 610, the processing unit 620, and the storage unit 630 are in communication connection. The storage unit 630 stores the instructions. The processing unit 620 is configured to execute the instruction stored in the storage unit 630. The transceiver unit 610 is configured to send or receive a specific signal under driving of the processing unit 620.

It may be clearly understood by a person skilled in the art that, for steps performed by the communications apparatus 600 and corresponding beneficial effects, refer to related descriptions of the second terminal device in the foregoing method embodiments. For brevity, details are not described herein again.

Figure 16:
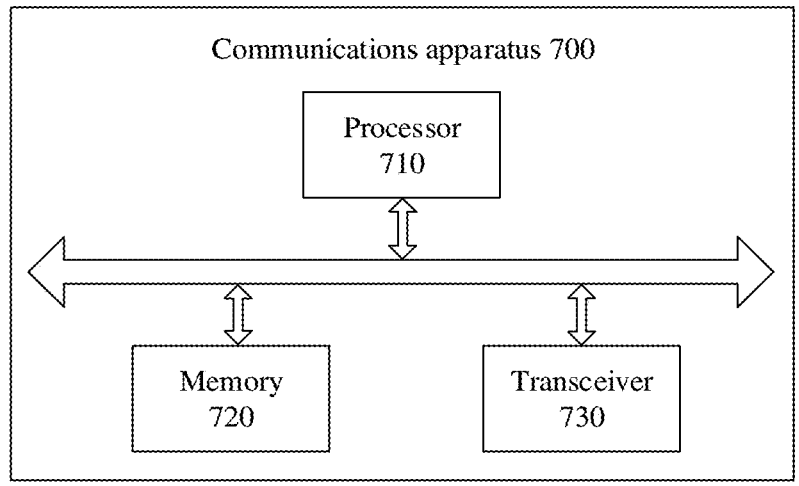
FIG. 16 is a schematic block diagram of a communications apparatus according to another embodiment of this application.

It should be understood that, the transceiver unit 610 may be implemented by a transceiver, and the processing unit 620 may be implemented by a processor. The storage unit may be implemented by a memory. As shown in FIG. 16, a communications apparatus 700 may include a processor 710, a memory 720, and a transceiver 730.

The communications apparatus 600 shown in FIG. 15 or the communications apparatus 700 shown in FIG. 16 can implement steps performed by the second terminal device in the foregoing method embodiments and the embodiments shown in FIG. 3, FIG. 4, FIG. 6, FIG. 7, FIG. 8, FIG. 9, and FIG. 12. For similar descriptions, refer to the descriptions in the foregoing corresponding method. For brevity, details are not described herein again.

It should be further understood that, the communications apparatus 600 shown in FIG. 15 or the communications apparatus 700 shown in FIG. 16 may be a terminal device.

Figure 17:
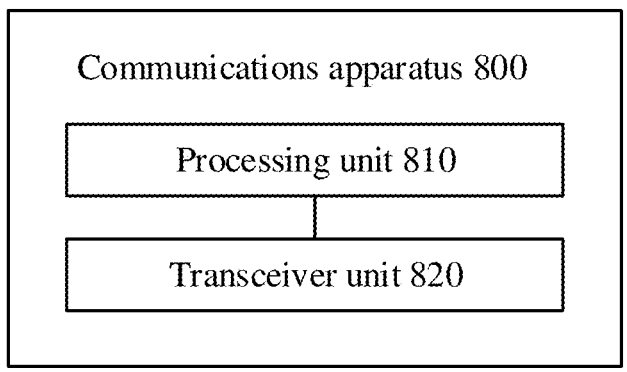
FIG. 17 is a schematic block diagram of a communications apparatus according to another embodiment of this application.

FIG. 17 is a schematic block diagram of a communications apparatus 800 according to an embodiment of this application. The apparatus 800 may correspond to the network device, or may be a chip or a component used in the network device described in the embodiments of the methods and the embodiments shown in FIG. 6 and FIG. 8. Modules or units in the apparatus 800 are configured to perform actions or processing processes performed by the network device in the foregoing embodiments of the method 300 and FIG. 4, FIG. 7, and FIG. 9. As shown in FIG. 17, the communications apparatus 800 may include a processing unit 810 and a transceiver unit 820.

The transceiver unit 820 is configured to receive, from a first terminal device or a second terminal device, channel state information of a first sidelink, where the first sidelink is a direct link from the first terminal device to the second terminal device.

The processing unit 810 is configured to determine, based on the channel state information of the first sidelink and first data, a transmission parameter of the first data and a time-frequency resource that is to be used by the first terminal device to send the first data, where the first data is data to be sent by the first terminal device on the first sidelink.

The transceiver unit 820 is further configured to send downlink control information to the first terminal device, where the downlink control information includes the transmission parameter of the first data and the time-frequency resource that is to be used to send the first data.

Optionally, in some embodiments of this application, the transceiver unit 820 is specifically configured to receive, from the first terminal device, the channel state information of the first sidelink on a first time-frequency resource, where the first time-frequency resource and a second time-frequency resource are different in time domain and/or frequency domain, the second time-frequency resource is a resource used by a network device to receive, from the first terminal device, channel state information of a downlink, and the downlink is a link from the network device to the first terminal device. The communications apparatus is the network device, or the network device includes the communications apparatus.

Optionally, in some embodiments of this application, the channel state information of the first sidelink includes an identifier of the second terminal device.

Optionally, in some embodiments of this application, the transceiver unit 820 is further configured to receive a first request message from the first terminal device, where the first request message is used by the first terminal device to request, from the network device, a time-frequency resource to be used to transmit the first data.

It should be understood that for a specific process of performing the foregoing corresponding steps by the units in the apparatus 800, refer to the foregoing related descriptions of the network device in the foregoing embodiments of the methods and the method embodiments in FIG. 4, FIG. 7, and FIG. 9. For brevity, details are not described herein again.

Optionally, the transceiver unit 820 may include a receiving unit (module) and a sending unit (module), configured to perform the steps of receiving information and sending information by the network device in the foregoing method embodiments and the embodiments shown in FIG. 4, FIG. 7, and FIG. 9. Optionally, the communications apparatus 800 may further include a storage unit 830, configured to store instructions executed by the transceiver unit 820 and the processing unit 810. The transceiver unit 820, the processing unit 810, and the storage unit 830 are in communication connection. The storage unit 830 stores the instructions. The processing unit 810 is configured to execute the instructions stored in the storage unit 830. The transceiver unit 820 is configured to send or receive a specific signal under driving of the processing unit 810.

Figure 18:
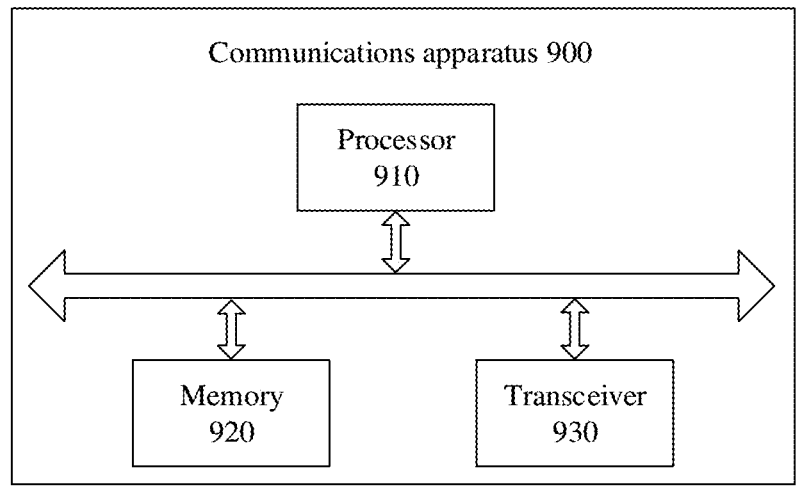
FIG. 18 is a schematic block diagram of a communications apparatus according to an embodiment of this application.

It should be understood that, the transceiver unit 820 may be implemented by a transceiver, and the processing unit 810 may be implemented by a processor. The storage unit may be implemented by a memory. As shown in FIG. 18, a communications apparatus 900 may include a processor 910, a memory 920, and a transceiver 930. The communications apparatus 900 may further include an antenna, configured to send, by using a radio signal, downlink data or downlink control signaling output by the transceiver 730.

The communications apparatus 800 shown in FIG. 17 or the communications apparatus 900 shown in FIG. 18 can implement the steps performed by the network device shown in FIG. 4, FIG. 7, and FIG. 9 and the embodiments of the methods. For similar descriptions, refer to the descriptions in the foregoing corresponding method. For brevity, details are not described herein again.

It should be further understood that, the communications apparatus 800 shown in FIG. 17 or the communications apparatus 900 shown in FIG. 18 may be a network device.

It should be further understood that division into the units in the apparatus is merely logical function division. In an actual implementation, all or some of the units may be integrated into one physical entity, or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatus for implementation. Alternatively, each unit may be stored in a memory in a form of a program to be invoked by a processing element of the apparatus to perform a function of the unit. The processing element herein may also be referred to as a processor, and may be an integrated circuit having a signal processing capability. In an implementation process, the steps in the foregoing methods or the foregoing units may be implemented by using a hardware integrated logic circuit in the processing element, or may be implemented in a form of software invoked by the processing element.

In an example, a unit in any one of the foregoing apparatuses may be one or more integrated circuits configured to implement the foregoing methods, for example, one or more application-specific integrated circuits (ASIC), one or more digital signal processors (DSP), one or more field programmable gate arrays (FPGA), or a combination of at least two of these integrated circuits. For another example, when the unit in the apparatus is implemented by scheduling a program by a processing element, the processing element may be a general purpose processor, for example, a central processing unit (CPU) or another processor that can invoke the program. For still another example, the units may be integrated and implemented in a form of a system-on-a-chip (SOC).

Figure 19:
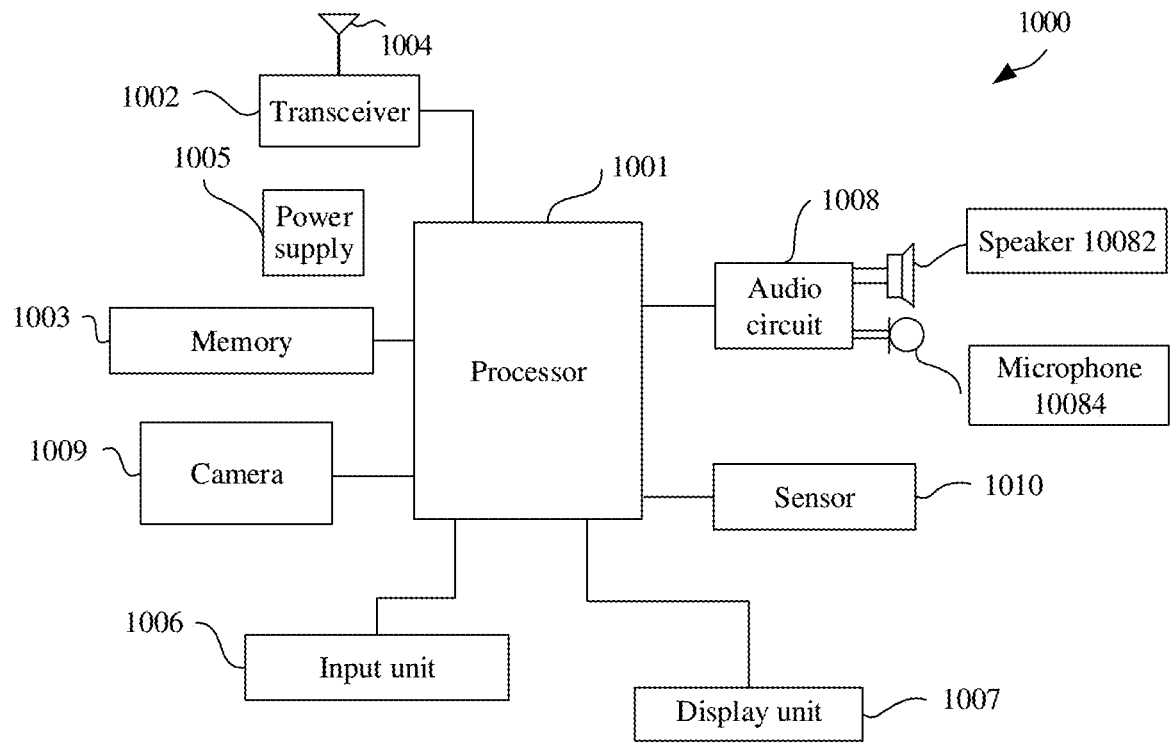
FIG. 19 is a schematic block diagram of a terminal device according to an embodiment of this application.

FIG. 19 is a schematic structural diagram of a terminal device 1000 according to an embodiment of this application. As shown in the figure, the terminal device 1000 includes a processor 1001 and a transceiver 1002. Optionally, the terminal device 1000 further includes a memory 1003. The processor 1001, the transceiver 1002, and the memory 1003 communicate with each other through an internal connection path, to transfer a control signal and/or a data signal. The memory 1003 is configured to store a computer program. The processor 1001 is configured to invoke the computer program from the memory 1003 and run the computer program, to control the transceiver 1002 to receive/send a signal. Optionally, the terminal device 1000 may further include an antenna 1004, configured to send, by using a radio signal, uplink data or uplink control signaling output by the transceiver 1002.

The processor 1001 and the memory 1003 may be integrated into one processing apparatus. The processor 1001 is configured to execute program code stored in the memory 1003, to implement the foregoing functions. During specific implementation, the memory 1003 may alternatively be integrated into the processor 1001, or may be independent of the processor 1001.

Specifically, the terminal device 1000 may correspond to the first terminal device or the second terminal device in the embodiments of the methods according to the embodiments of this application and the embodiments shown in FIG. 3 to FIG. 12. The terminal device 1000 may include units configured to perform the methods performed by the first terminal device or the second terminal device in the embodiments of the methods and the embodiments shown in FIG. 3, FIG. 4, FIG. 6, FIG. 7, FIG. 8, FIG. 9, and FIG. 12. In addition, the units in the terminal device 1000 and the foregoing other operations and/or functions are intended to implement the embodiments of the methods and corresponding procedures in the embodiments shown in FIG. 3, FIG. 4, FIG. 6, FIG. 7, FIG. 8, FIG. 9, and FIG. 12.

The processor 1001 may be configured to perform an action implemented inside the first terminal device or the second terminal device in the foregoing method embodiments, and the transceiver 1002 may be configured to perform an action of sending or receiving by the first terminal device or the second terminal device in the foregoing method embodiments. For details, refer to the descriptions in the foregoing method embodiments. Details are not described herein again.

Optionally, the terminal device 1000 may further include a power supply 1005, configured to supply power to various components or circuits in the terminal device.

In addition, to make functions of the terminal device more perfect, the terminal device 1000 may further include one or more of an input unit 1006, a display unit 1007, an audio circuit 1008, a camera 1009, a sensor 1010, and the like, and the audio circuit may further include a speaker 10082, a microphone 10084, and the like.

Figure 20:
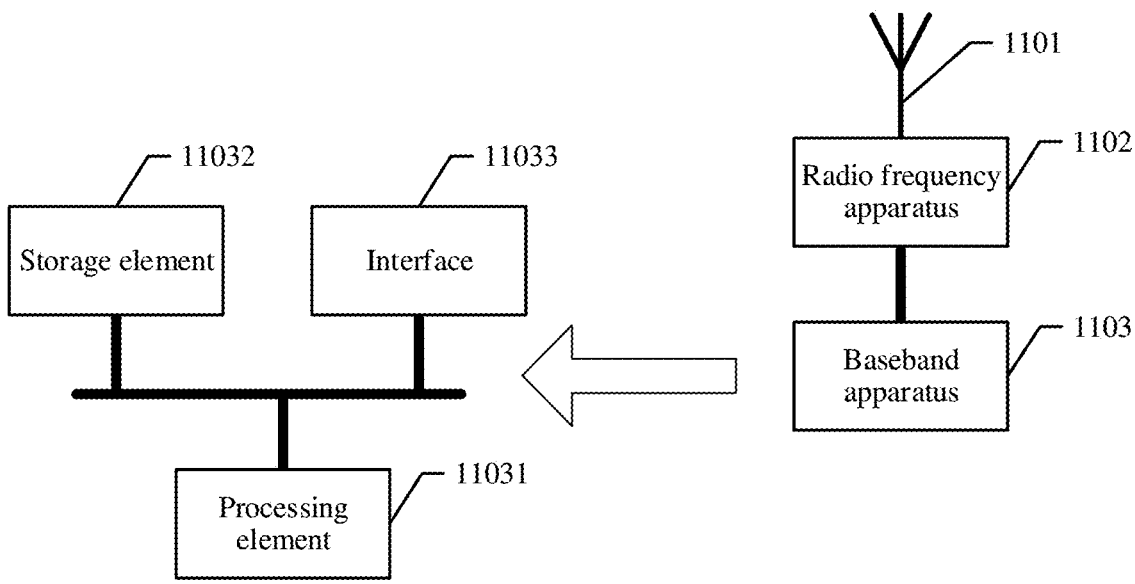
FIG. 20 is a schematic block diagram of a network device according to another embodiment of this application.

FIG. 20 is a schematic structural diagram of a network device according to an embodiment of this application. The network device is configured to implement operations of the network device in the foregoing embodiments. As shown in FIG. 20, the network device includes an antenna 1101, a radio frequency apparatus 1102, and a baseband apparatus 1103. The antenna 1101 is connected to the radio frequency apparatus 1102. In an uplink direction, the radio frequency apparatus 1102 receives, through the antenna 1101, information sent by a terminal, and sends, to the baseband apparatus 1103 for processing, the information sent by the terminal device. In a downlink direction, the baseband apparatus 1103 processes information of a terminal, and sends the information to the radio frequency apparatus 1102. The radio frequency apparatus 1102 processes the information of the terminal device, and then sends the processed information to the terminal through the antenna 1101.

The baseband apparatus 1103 may include one or more processing elements 11031, for example, include a main control CPU and another integrated circuit. In addition, the baseband apparatus 1103 may further include a storage element 11032 and an interface 11033. The storage element 11032 is configured to store a program and data. The interface 11033 is configured to exchange information with the radio frequency apparatus 1102, and the interface is, for example, a common public radio interface (CPRI). The foregoing apparatus used in the network device may be located in the baseband apparatus 1103. For example, the foregoing apparatus used in the network device may be a chip in the baseband apparatus 1103. The chip includes at least one processing element and an interface circuit. The processing element is configured to perform the steps of any method performed by the network device. The interface circuit is configured to communicate with another apparatus. In an implementation, units of the network device that implement the steps in the foregoing methods may be implemented by a program scheduled by a processing element. For example, the apparatus used for the network device includes a processing element and a storage element. The processing element invokes a program stored in the storage element, to perform the methods performed by the network device in the foregoing method embodiments. The storage element may be a storage element located on a same chip as the processing element, namely, an on-chip storage element, or may be a storage element located on a different chip from the processing element, namely, an off-chip storage element.

The terminal device and the network device in the foregoing apparatus embodiments may completely correspond to the terminal device or the network device in the method embodiments, and a corresponding module or unit performs a corresponding step. For example, when the apparatus is implemented by a chip, the receiving unit may be an interface circuit that is of the chip and that is configured to receive a signal from another chip or apparatus. The foregoing sending unit is an interface circuit of the apparatus, and is configured to send a signal to another apparatus. For example, when the apparatus is implemented by a chip, the sending unit is an interface circuit that is of the chip and that is configured to send a signal to another chip or apparatus.

It should be understood that in the embodiments of this application, the processor may be a CPU, or the processor may be another general purpose processor, a DSP, an ASIC, an FPGA or another programmable logic device, a discrete gate or a transistor logic device, a discrete hardware component, or the like.

It should be further understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

The terminal device and the network device in the foregoing apparatus embodiments may completely correspond to the terminal device or the network device in the method embodiments, and a corresponding module or unit performs a corresponding step. For example, when the apparatus is implemented by a chip, the receiving unit may be an interface circuit that is of the chip and that is configured to receive a signal from another chip or apparatus. The foregoing sending unit is an interface circuit of the apparatus, and is configured to send a signal to another apparatus. For example, when the apparatus is implemented by a chip, the sending unit is an interface circuit that is of the chip and that is configured to send a signal to another chip or apparatus.

The embodiments of this application further provide a communications system. The communications system includes the foregoing first terminal device and/or second terminal device, and the foregoing network device.

The embodiments of this application further provide a computer-readable medium, configured to store computer program code. The computer program includes instructions used to perform the sidelink quality measurement method in the embodiments of this application in the method 300. The readable medium may be a read-only memory (ROM) or a random access memory (RAM). This is not limited in this embodiment of this application.

This application further provides a computer program product. The computer program product includes instructions. When the instructions are executed, the first terminal device, the second terminal device, and the network device are enabled to respectively perform operations corresponding to the first terminal device, the second terminal device, and the network device in the foregoing methods.

An embodiment of this application further provides a system chip. The system chip includes a processing unit and a communications unit. The processing unit may be, for example, a processor, and the communications unit may be, for example, an input/output interface, a pin, or a circuit. The processing unit may execute computer instructions, so that the chip in a communications apparatus performs any sidelink quality measurement method that is provided in the foregoing embodiments of this application.

Optionally, any communications apparatus provided in the foregoing embodiments of this application may include the system chip.

Optionally, the computer instructions are stored in a storage unit.

Optionally, the storage unit is a storage unit inside the chip, such as a register or a cache. Alternatively, the storage unit may be a storage unit that is inside the terminal and that is located outside the chip, such as a ROM, another type of static storage device that can store static information and instructions, or a RAM. The processor mentioned in any of the foregoing descriptions may be a CPU, a microprocessor, an ASIC, or one or more integrated circuits for controlling program execution of the foregoing method. The processing unit and the storage unit may be decoupled, are separately disposed on different physical devices, and are connected in a wired or wireless manner to implement functions of the processing unit and the storage unit, to support the system chip in implementing various functions in the foregoing embodiments. Alternatively, the processing unit and the memory may be coupled to a same device.

It may be understood that the memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. Through example but not limitative description, many forms of random access memories (RAM) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

Terms "system" and "network" may be used interchangeably in this specification. The term "and/or" in this specification describes only an association relationship for describing associated objects and represents that there may be three relationships. For example, A and/or B may represent three cases: There is only A, there are both A and B, and there is only B. In addition, the character "/" in this specification usually indicates an "or" relationship between the associated objects.

The terms "uplink" and "downlink" in this application are used to describe a data/information transmission direction in a specific scenario. For example, an "uplink" direction is usually a direction in which data/information is transmitted from a terminal to a network side, or a direction in which data/information is transmitted from a distributed unit to a centralized unit, and a "downlink" direction is usually a direction in which data/information is transmitted from a network side to a terminal, or a direction in which data/information is transmitted from a centralized unit to a distributed unit. It may be understood that the "uplink" and the "downlink" are only used to describe transmission directions of data/information, and neither a specific start device nor a specific end device of the data/information transmission is limited.

Names may be assigned to various objects that may appear in this application, for example, various messages/information/devices/network elements/systems/apparatuses/actions/operations/procedures/concepts. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

A person of ordinary skill in the art may be aware that, in combination with the examples described in the embodiments disclosed in this specification, units and algorithm steps may be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and units, refer to corresponding processes in the foregoing method embodiment. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual coupling or direct coupling or communication connection may be implemented by using some interfaces. The indirect coupling or communication connection between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for a computer device (which may be a personal computer, a server, a network device, or the like) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
sending, by a first terminal device, a reference signal to a second terminal device;
receiving, by the first terminal device from the second terminal device, channel state information of a first sidelink and channel state information of a second sidelink, wherein the second sidelink is a direct link from the second terminal device to a third terminal device, the reference signal is used to determine the channel state information of the first sidelink, and the first sidelink is a direct link from the first terminal device to the second terminal device;

obtaining, by the first terminal device, channel state information of a third sidelink, wherein the third sidelink is a direct link from the first terminal device to the third terminal device; and determining, by the first terminal device, based on the channel state information of the third sidelink, the channel state information of the second sidelink, and the channel state information of the first sidelink, a link to use to send data or control information to the third terminal device.

2. The method according to claim 1, wherein obtaining, by the first terminal device, the channel state information of the third sidelink comprises:

receiving, by the first terminal device, the channel state information of the third sidelink from the third terminal device; or receiving, by the first terminal device, the channel state information of the third sidelink from a network device.

3. The method according to claim 1, further comprising:

determining, by the first terminal device, based on the channel state information of the first sidelink and first data, a transmission parameter of the first data and a time-frequency resource that is to be used to send the first data; and sending, by the first terminal device, the first data to the second terminal device on the time-frequency resource based on the transmission parameter.

4. The method according to claim 3, further comprising:

sending, by the first terminal device, first indication information to a network device, wherein the first indication information indicates a start position and a size of the time-frequency resource to be used to send the first data; and receiving, by the first terminal device, downlink control information from the network device, wherein the downlink control information comprises grant information of the time-frequency resource, and the grant information indicates to the first terminal device to send the first data on the time-frequency resource.

5. The method according to claim 1, wherein the channel state information of the second sidelink comprises an identifier of the second terminal device and an identifier of the third terminal device, wherein a time domain position of a field that carries the identifier of the second terminal device is before a time domain position of a field that carries the identifier of the third terminal device, and the identifier of the second terminal device and the identifier of the third terminal device indicate the second sidelink.

6. A method, comprising:

receiving, by a second terminal device, a reference signal from a first terminal device;

determining, by the second terminal device, channel state information of a first sidelink based on the reference signal, wherein the first sidelink is a direct link from the first terminal device to the second terminal device;

obtaining, by a second terminal device, channel state information of a second sidelink, wherein the second sidelink is a direct link from the second terminal device to a third terminal device; and sending, by the second terminal device to the first terminal device or a network device, the channel state information of the first sidelink and the channel state information of the second sidelink.

7. The method according to claim 6, wherein obtaining, by the second terminal device, the channel state information of the second sidelink comprises:

receiving, by the second terminal device, the channel state information of the second sidelink from the third terminal device; or receiving, by the second terminal device, the channel state information of the second sidelink from a network device.

8. The method according to claim 6, wherein the channel state information of the second sidelink comprises an identifier of the second terminal device and an identifier of the third terminal device, a time domain position of a field that carries the identifier of the second terminal device is before a time domain position of a field that carries the identifier of the third terminal device, and the identifier of the second terminal device and the identifier of the third terminal device indicate the second sidelink.

9. A method, comprising:

receiving, by a network device from a first terminal device or a second terminal device, channel state information of a first sidelink, wherein the first sidelink is a direct link from the first terminal device to the second terminal device;

receiving, by the network device from a third terminal device, channel state information of a second sidelink and channel state information of a third sidelink, wherein the second sidelink is a direct link from the second terminal device to the third terminal device, and the third sidelink is a direct link from the first terminal device to the third terminal device;

determining, by the network device based on the channel state information of the third sidelink, the channel state information of the second sidelink, and the channel state information of the first sidelink, a first link for sending data or control information by the first terminal device to the third terminal device; and sending, by the network device, information about the first link to the first terminal device.

10. The method according to claim 9, further comprising:

determining, by the network device based on the channel state information of the first sidelink and first data, a transmission parameter of the first data and a time-frequency resource that is to be used by the first terminal device to send the first data, wherein the first data is data to be sent by the first terminal device on the first sidelink; and sending, by the network device, downlink control information to the first terminal device, wherein the downlink control information comprises the transmission parameter of the first data and the time-frequency resource that is to be used to send the first data.

11. A communications apparatus, comprising:

a memory storage comprising instructions; and one or more processors in communication with the memory storage, wherein the execution of the instructions by the one or more processors causes the apparatus to:

send a reference signal to a second terminal device;

receive, from the second terminal device, channel state information of a first sidelink and channel state information of a second sidelink, wherein the second sidelink is a direct link from the second terminal device to a third terminal device, the reference signal is used to determine the channel state information of a first sidelink, and the first sidelink is a direct link from a first terminal device to the second terminal device;

obtain channel state information of a third sidelink, wherein the third sidelink is a direct link from the first terminal device to the third terminal device; and determine, based on the channel state information of the third sidelink, the channel state information of the second sidelink, and the channel state information of the first sidelink, a link to use to send data or control information to the third terminal device.

12. The communications apparatus according to claim 11, wherein the execution of the instructions by the one or more processors causes the apparatus to:

receive the channel state information of the third sidelink from the third terminal device; or receive the channel state information of the third sidelink from a network device.

13. The communications apparatus according to claim 11, wherein the execution of the instructions by the one or more processors further causes the apparatus to:

obtain a transmission parameter of first data and a time-frequency resource to be used to send the first data, wherein the time-frequency resource to be used to send the first data and the transmission parameter of the first data are determined based on the channel state information of the first sidelink and the first data; and send the first data to the second terminal device on the time-frequency resource based on the transmission parameter.

14. The communications apparatus according to claim 13, wherein the execution of the instructions by the one or more processors further causes the apparatus to:

send first indication information to a network device, wherein the first indication information indicates a start position and a size of the time-frequency resource to be used to send the first data; and receive downlink control information from the network device, wherein the downlink control information comprises grant information of the time-frequency resource, and the grant information indicates to the first terminal device to send the first data on the time-frequency resource.

15. The communications apparatus according to claim 11, wherein the channel state information of the second sidelink comprises an identifier of the second terminal device and an identifier of the third terminal device, a time domain position of a field that carries the identifier of the second terminal device is before a time domain position of a field that carries the identifier of the third terminal device, and the identifier of the second terminal device and the identifier of the third terminal device are used to indicate the second sidelink.

16. A communications apparatus, comprising:

a memory storage comprising instructions; and one or more processors in communication with the memory storage, wherein the execution of the instructions by the one or more processors causes the apparatus to:

receive a reference signal from a first terminal device;

determine channel state information of a first sidelink based on the reference signal, wherein the first sidelink is a direct link from the first terminal device to a second terminal device;

obtain channel state information of a second sidelink, wherein the second sidelink is a direct link from the second terminal device to a third terminal device; and send, to the first terminal device or a network device, the channel state information of the first sidelink and the channel state information of the second sidelink.

17. The communications apparatus according to claim 16, wherein the execution of the instructions by the one or more processors causes the apparatus to:

receive the channel state information of the second sidelink from the third terminal device; or receive the channel state information of the second sidelink from a network device.

18. The communications apparatus according to claim 16, wherein the channel state information of the second sidelink comprises an identifier of the second terminal device and an identifier of the third terminal device, a time domain position of a field that carries the identifier of the second terminal device is before a time domain position of a field that carries the identifier of the third terminal device, and the identifier of the second terminal device and the identifier of the third terminal device indicate the second sidelink.

19. A communications apparatus, comprising:

a memory storage comprising instructions; and one or more processors in communication with the memory storage, wherein the execution of the instructions by the one or more processors causes the apparatus to:

receive, from a first terminal device or a second terminal device, channel state information of a first sidelink, wherein the first sidelink is a direct link from the first terminal device to the second terminal device;

receive channel state information of a second sidelink and channel state information of a third sidelink from a third terminal device, wherein the second sidelink is a direct link from the second terminal device to the third terminal device, and the third sidelink is a direct link from the first terminal device to the third terminal device;

determine, based on the channel state information of the third sidelink, the channel state information of the second sidelink, and the channel state information of the first sidelink, a link for sending data or control information by the first terminal device to the third terminal device; and send information about the link to the first terminal device.

20. The communications apparatus according to claim 19, wherein the execution of the instructions by the one or more processors further causes the apparatus to:

determine, based on the channel state information of the first sidelink and first data, a transmission parameter of the first data and a time-frequency resource that is to be used by the first terminal device to send the first data, wherein the first data is to be sent by the first terminal device on the first sidelink; and send downlink control information to the first terminal device, wherein the downlink control information comprises the transmission parameter of the first data and the time-frequency resource that is to be used to send the first data.

* * * * *